US007616376B2

(12) United States Patent
Arsenault et al.

(10) Patent No.: US 7,616,376 B2
(45) Date of Patent: Nov. 10, 2009

(54) WIDELY WAVELENGTH TUNABLE POLYCHROME COLLOIDAL PHOTONIC CRYSTAL DEVICE

(75) Inventors: Andre Arsenault, Toronto (CA); Ian Manners, Oakville (CA); Hernan Miguez, Valencia (ES); Geoffrey Alan Ozin, Toronto (CA)

(73) Assignee: The Governing Council of the University of Toronto (CA)

( * ) Notice: Subject to any disclaimer, the term of this patent is extended or adjusted under 35 U.S.C. 154(b) by 1 day.

(21) Appl. No.: 12/046,313

(22) Filed: Mar. 11, 2008

(65) Prior Publication Data

US 2008/0224103 A1   Sep. 18, 2008

Related U.S. Application Data

(62) Division of application No. 10/681,374, filed on Oct. 9, 2003, now Pat. No. 7,364,673.

(60) Provisional application No. 60/416,910, filed on Oct. 9, 2002.

(51) Int. Cl.
*G02F 1/00* (2006.01)
*G02F 1/355* (2006.01)
(52) U.S. Cl. ...................... 359/321; 252/582
(58) Field of Classification Search .............. 359/245, 359/288, 321; 252/582
See application file for complete search history.

(56) References Cited

U.S. PATENT DOCUMENTS 4,351,929 A    9/1982   Gibbs et al.
4,919,865 A    4/1990   Nelson
6,014,246 A *  1/2000   Asher et al. .............. 359/288
6,797,057 B1   9/2004   Amos et al.
2002/0062782 A1 5/2002  Norris et al.
2002/0118435 A1 8/2002  Foulger et al.

FOREIGN PATENT DOCUMENTS

WO       WO 01 63345 A      8/2001

OTHER PUBLICATIONS

Galloro, J. et al., "Replicating the Structure of a Crosslinked Polyferrocenylsilane Inverse Opal in the Form of a Magnetic Ceramic", *Advanced Functional Materials*, May 2002, Wiley-Vch, Germany, vol. 12 No. 5, pp. 382-388.
Satoh, S., et al., "Temperature and Voltage Dependent Optical Properties of Conducting Polymer in Synthetic Opal as Photonic Crystal", *International Conference on Science and Technology of Synthetic Metals*, Gastein, Austria, Jul. 15-21, 2000, vol. 121, No. 1-3, pp. 1503-1504.

(Continued)

*Primary Examiner*—William C Choi
(74) *Attorney, Agent, or Firm*—Leydig, Voit & Mayer

(57) ABSTRACT

A method of wavelength tuning a composite material. The method includes the steps of: producing an ordered array of first constituents having a first refractive index embedded within a cross-linked metallopolymer network having a second refractive index different than the first refractive index, the ordered array of first constituents having a lattice spacing giving rise to Bragg diffraction when the composite material is illuminated; and switching the electronic configuration of the cross-linked metallopolymer network so that the cross-linked polymer network changes dimensions and modulates the lattice spacing of the ordered array of first constituents, which shifts the Bragg diffraction wavelength to a pre-selected wavelength.

22 Claims, 17 Drawing Sheets

OTHER PUBLICATIONS

Debord, J.D., et al., "Color-Tunable Colloidal Crystals from Soft Hydrogel Nanoparticles", *Advanced Materials*, VCH Verlagsgesellschaft, Weinheim, DE, vol. 14, No. 9, May 3, 2002, pp. 658-662.

Kulbaba, K., et al., Organometallic Gels: Characterization and Electrochemical Studiees of Swellable Thermally Crosslinked Poly (ferrocenylsilane)s, *Macromolecular Chemistry and Physics*, Wiley VCH, Weinheim, DE, vol. 202, No. 9, Jul. 6, 2001, pp. 1768-1775.

Takeoka, Y., et al., "Ployer Gels that Memorize Structures of Mesoscopically Sized Templates", Dynamic and Optical Nature of Periodic Ordered Mesoporouse Chemical Gels:, Langmuir, *ACS*, Washington, DC., vol. 18, 2002, pp. 5977-5980.

Foulger, S.H., et al., "Integration of Photonic Bandgap Composites with Piezoelectric Actuators for Rejection Wavelength Tuning", *Nanoscale Optics and Application*, Seattle, WA, USA, Jul. 9, 2002, vol. 4809, pp. 40-50.

Arsenault, Andre, C., et al., "A Polychromic, Fast Response Metallopolmer Gel Photonic Crystal with Solvent and Redox Tunability: A Step Towards Photonic Ink (P-ink)", *Adv Mater; Advanced Materials*, Mar. 17, 2003, vol. 15, No. 6., pp. 503-507.

MacLachlan, Mark J., "Spirocyclic [1] Ferrocenophanes: Novel Cross-Linking Agents for Ring-Opened Poly(ferrocenes)", Department of Chemistry, University of Toronto, Macromolecules, vol. 29. No. 26, 1996, Aug. 20, 1996, pp. 8562-8564.

\* cited by examiner

WIDELY WAVELENGTH TUNABLE POLYCHROME COLLOIDAL PHOTONIC CRYSTAL DEVICE

CROSS REFERENCE TO RELATED U.S. PATENT APPLICATION

This patent application is a divisional of U.S. application Ser. No. 10/681,374 filed Oct. 9, 2003, which relates to, and claims the benefit of, U.S. provisional patent application Ser. No. 60/416,910 filed on Oct. 9, 2002, entitled WIDELY WAVELENGTH TUNABLE POLYCHROME COLLOIDAL PHOTONIC CRYSTAL DEVICE, which is incorporated herein in its entirety.

FIELD OF THE INVENTION

The present invention relates to a composite photonic crystal material produced made of a cross-linked metallopolymer network composite film including microparticles which has an adjustable lattice dimension so that the wavelength of optically Bragg diffracted light originating from stop bands or higher energy bands of the composite film can be tuned. More particularly the present invention provides a method of making widely wavelength tunable polychrome colloidal photonic crystal devices, specifically a new type of 3-D Bragg diffractive optical element in the form of a film or patterned film or shape of any dimension or array of shapes of any dimension that has a continuously and finely, rapidly and reversibly, reproducibly and predictably, adjustable photonic crystal lattice dimension and concomitantly the predetermined ability to cause light of widely different wavelengths to be continuously and finely, rapidly and reversibly, reproducibly and predictably, and efficiently reflected or transmitted across the ultraviolet, visible and near infrared regions of the electromagnetic spectrum.

BACKGROUND OF THE INVENTION

Photonic crystals are an emerging class of materials, which interact with electromagnetic radiation through a periodic modulation in their refractive indices when the periodicity coincides with the scale of the radiation wavelength (see E. Yablonovitch, Phys. Rev. Lett. 58, 2059 (1987), and. S. John, Phys. Rev. Lett. 58, 2486 (1987)). Though for the moment they are objects of mostly fundamental scientific interest, photonic crystals will likely become increasingly prevalent in both basic and applied circles, furthering their potential for a myriad of proposed and unforeseen applications, (see: J. D. Joannopoulos, P. R. Villeneuve, Nature 386, 143 (1997)).

A particularly elegant method for fabricating these intricately structured materials involves the self-assembly of a collection of size-monodisperse spherical colloids into a long-range ordered lattice of well-defined geometry. Spherical colloids of both inorganic and polymeric composition have been studied exhaustively (see P. C. Hiemenz, R. Rajagopalan "Principles of Colloid and Surface Chemistry", Marcel Dekker Inc., New York (1997)), can be routinely obtained as monodisperse suspensions, and are quite inexpensive to produce. Given these considerations, and recent success in assembling these colloids into face-centered cubic (fcc) crystals with very low defect concentration, it is not surprising that they have been thrust to the forefront of photonic crystal research (For recent reviews see (a) Y. Xia, B. Gates, Z-Y. Li, Adv. Mater. 13, 409 (2001); (b) V. L. Colvin, MRS Bull. 26, 637 (2001)).

The concept of a self-assembled colloidal photonic crystal, though a new one, has been successfully demonstrated many times, and a great variety of materials have been incorporated into these systems by templating against colloidal crystals or their replicas (arrays of air holes in dielectric media), see B. T. Holland, C. Blanford, A. Stein, Science 1998, 281, 538. Consequently, research in the area has begun to focus on designing systems not only composed of materials unexplored in this regard, but capable of being tuned in a variety of ways by external stimuli, K. Busch, S. John, NATO Sci. Ser., Ser. C: Math. Phys. Sci. 563, 41 (2001). The promise of this approach lies not only in being able to vary optical properties in a very controlled manner, but also in using the intricate light-microstructure interplay that creates structural color (that is, to be contrasted with color from pigments or chromophores) in these colloidal photonic crystal materials to effect accurate sensing with an easily measurable optical response.

One of the ways in which a colloidal photonic crystal can be tuned is via a mechanical response, that is, changing external conditions such that the crystal changes in shape or dimensions. Seminal studies in the experimental demonstration of this concept, using the volume changes of a swollen hydrogel have been made by Asher and coworkers, see J. M. Weissman, H. B. Sunkara, A. S. Tse, S. A. Asher, Science 274, 959 (1996). Their approach was to fix in a hydrogel matrix an array of highly charged latex microspheres self-assembled in a non-close packed array through mutually repulsive electrostatic interactions in a rigorously de-ionized medium.

These so-called polymerized crystalline colloidal arrays (PCCA's) could take advantage of the well-known properties of organic polymer acrylamide-based gels, (T. Tanaka, Phys. Rev. Lett. 40, 820 (1978)) as well as perform sensing functions by incorporating into these organic polymers receptors for specific analytes (J. H. Holtz, S. A. Asher, Nature 389, 829 (1997)). These systems are quite elegant, but suffer from a number of drawbacks such as poor mechanical stability due to high solvent content, slow response to stimuli, and the polycrystalline nature of the samples, which prevents them from being able to accurately control features of the Bragg optical diffraction peak, such as its wavelength, width and intensity.

Some researchers have taken the lead of Asher and coworkers and utilized the PCCA system and post-modified it to achieve a higher mechanical stability, (S. H. Foulger, J. Ping, A. C. Lattam, Y. Ying, D. W. Smith Jr., Adv. Mater. 13, 1898 (2001)) but this system still suffers from the same fundamental drawbacks as the original materials developed by Asher et al. Still others have used the same organic polymer hydrogels employed by these prior researchers and have incorporated them into close-packed colloidal crystals, resulting in a similar type of material simply made by a slightly modified route (Y. Takeoka, M. Watanabe, Langmuir 18, 5977 (2002)). The important point to note about this prior PCCA work is that the matrix that encapsulates the colloidal crystal is an organic polymer gel, which as amplified upon below is quite distinct in its composition and properties to the metallopolymer gels used in the invention described herein.

The materials investigated in the invention described herein are planarized composite colloidal photonic crystals consisting of an ordered face centered cubic (fcc) arrangement of sub-micrometer size microspheres in a matrix of weakly cross-linked polyferrocenylsilane (PFS), whose cross-link density can be continuously and finely adjusted, a novel metallopolymer (also referred to in this invention as an metallopolymer), which has the unique ability to function as a reversibly redox tunable, swellable-shrinkable metallopolymer gel, (K. Kulbaba, M. J. MacLachlan, C. E. B. Evans, I. Manners, Macromol. Chem. Phys. 202, 1768

(2001)). This class of reversibly redox tunable, swellable-shrinkable colloidal photonic crystal metallopolymer gel composite materials are entirely new composites of this genre have never been made before nor reported before in the patent or open literature. They display unique chemical and physical properties because the metallopolymer gel matrix unlike all known organic polymer gels has metal atoms that are directly integrated into the backbone of the polymer. As a result of a polymer backbone comprised of metal atoms these metallopolymer gels overcome many deficiencies inherent in organic polymer analogues and also introduce additional and valuable functionality by virtue of the properties of the metal-backbone containing polymer used (I. Manners, Science 294, 1664 (2001)). Because this class of redox-active metallopolymers have well-defined, stable redox couples, the state of charge of the metallopolymer can be continuously, finely and reversibly changed in a straightforward manner, chemically or electrochemically, to effect a change in its interactions with a fluid medium. This can result in either a chemo-mechanically or electro-mechanically induced expansion or contraction of the colloidal photonic crystal lattice upon switching the metallopolymer gel to the oxidized or reduced state due to the variety of fluid media available.

Although there has been one previous report dealing with the electrochemical tunability of the optical properties of an inverse colloidal crystal made of tungsten trioxide, (Sumida, T.; Wada, Y.; Kitamura, T.; Yanagida, S. Chemistry Letters 2, 180 (2002)) it is important to note that this system is completely different to the one described in the present invention in that tungsten trioxide is a solid state material and not a polymer and further the tunability of the optical colloidal photonic crystal properties arises from a classical metal-nonmetal induced refractive index change in the tungsten trioxide inverted colloidal photonic crystal matrix that occurs on electrochemically injecting lithium ions and electrons into the void spaces within the structure and conduction band respectively and not a change in colloidal photonic crystal lattice dimensions, which is the basis of the mode of operation of the metallopolymer gel colloidal photonic crystal composite materials in the embodiment described herein.

It would be very advantageous to provide an economical method of producing colloidal photonic crystal materials which are rapidly and reproducibly wavelength tunable.

SUMMARY OF THE INVENTION

It is an object of the present invention to describe a straightforward synthetic strategy for making a widely wavelength tunable polychrome colloidal photonic crystal device that is comprised of a composite material wherein the microstructure of the composite material is based upon an organized array of diffracting units, such as microspheres, encapsulated within a redox active cross-linked metallopolymer network, where the term "cross-linked network" is used interchangeably with the word "gel" in this invention.

In one aspect of the invention there is provided a wavelength tunable composite material, comprising:

an ordered array of first constituents having a first refractive index embedded within a cross-linked metallopolymer network having a second refractive index different than the first refractive index, the ordered array of first constituents having a lattice spacing giving rise to Bragg diffraction when the composite material is illuminated, the cross-linked metallopolymer network being comprised of a polymer backbone including metal atoms chemically integrated therein, the cross-linked metallopolymer network having an electronic configuration dependant on the metal atoms, the metal atoms being switchable between more than one electronic configuration, the cross-linked metallopolymer network being expandable and contractible in response to controlled uptake and expulsion, respectively, of a selected fluid by the cross-linked metallopolymer network so that when the cross-linked metallopolymer network takes up the selected fluid it expands which shifts a Bragg diffraction wavelength to longer wavelengths and when the cross-linked metallopolymer network expels the selected fluid it contracts which shifts the Bragg diffraction wavelength to shorter wavelengths, the amount of fluid uptake and expulsion being controlled by controlling the electronic configuration of the cross-linked metallopolymer network.

In another aspect of the invention there is provided a method of wavelength tuning a composite material, comprising:

a) producing an ordered array of first constituents having a first refractive index embedded within a cross-linked metallopolymer network having a second refractive index different than the first refractive index, the ordered array of first constituents having a lattice spacing giving rise to Bragg diffraction when the composite material is illuminated, the cross-linked metallopolymer network being comprised of a polymer backbone including metal atoms chemically integrated into the polymer backbone and connected together directly or through linking units, the cross-linked polymer network having an electronic configuration dependant on the metal atoms, the metal atoms being switchable between more than one electronic configuration, the cross-linked metallopolymer network being expandable and contractible in response to controlled uptake and expulsion, respectively, of a selected fluid by the cross-linked metallopolymer network so that when the cross-linked polymer network takes up the selected fluid it expands which shifts a Bragg diffraction wavelength to longer wavelengths and when the cross-linked polymer network expels the selected fluid it contracts which shifts the Bragg diffraction wavelength to shorter wavelengths, the amount of fluid uptake and expulsion being controlled by controlling the electronic configuration of the cross-linked polymer network; and b) switching the electronic configuration of the cross-linked metallopolymer network so that the cross-linked polymer network changes dimensions and modulates the lattice spacing of the ordered array of first constituents, which shifts the Bragg diffraction wavelength to a pre-selected wavelength.

The microspheres are self-assembled into a colloidal photonic crystal and in such a way that the microspheres are not rigidly connected and the interstitial spaces of the colloidal photonic crystal lattice are filled to a certain extent with the cross-linked metallopolymer network. The polymer gel is selected so that it can be reversibly swollen or shrunken by a redox change or fluid (liquid or vapor) change applied to the metallopolymer-gel. The colloidal photonic crystal-metallopolymer gel composite material is in the form of a film or patterned film or shape of any dimension or an array of shapes of any dimension and the film or patterned film or shape of any dimension or array of shapes of any dimension has a controlled area and thickness with the film or patterned film or shape of any dimension or array of shapes of any dimension being grown upon the substrate and made adherent to thereto.

The substrate may be chosen to be electrically conducting or insulating and optically transparent or reflective or absorptive and the lattice dimensions of the colloidal photonic crystal-metallopolymer gel composite material may be redox adjustable or fluid adjustable in a continuous and fine, rapid and reversible, reproducible and predictable manner thereby providing a means for concomitantly tuning the wavelength of optically Bragg diffracted light originating from stop bands or higher energy bands through the adjustable lattice dimension colloidal photonic crystal metallopolymer gel composite film or patterned film or shape of any dimension or array of shapes of any dimension in a continuous and fine, rapid and reversible, reproducible and predictable fashion across the ultraviolet, visible and near infrared wavelength regions of the optical electromagnetic spectrum thereby providing a novel kind of chemo-mechanical and electro-mechanical broadly color tunable Bragg optical diffractive device whose polychrome optical functionality could find utility in wavelength tunable filter, mirror, multiplexor, compensator, limiter and switching optical telecommunication applications as Well as optical sensing and optical imaging, display, fingerprinting and printing applications.

Another object of this invention is to describe a straightforward synthetic strategy that can effect the removal of the constituent microspheres from the aforementioned colloidal photonic crystal metallopolymer gel composite film to create a macroporous metallopolymer-gel photonic crystal film whose lattice dimensions may be redox adjustable or fluid adjustable in a continuous and fine, rapid and reversible, reproducible and predictable manner thereby providing a means for concomitantly tuning the wavelength of optically Bragg diffracted light originating from stop bands or higher energy bands from said macroporous metallopolymer-gel photonic crystal film in a continuous and fine, rapid and reversible, reproducible and predictable fashion across the ultraviolet, visible and near infrared wavelength regions of the optical electromagnetic spectrum thereby providing a novel and distinct type of chemo-mechanical and electro-mechanical broadly color tunable Bragg optical diffractive device whose polychrome optical functionality could find utility in wavelength tunable filter, mirror, multiplexor, compensator, limiter and switching optical telecommunication applications as well as sensing, imaging, display, printing and fingerprinting applications.

When microspheres are used they may have diameters in the range of 0.1 to 5 microns. A preferred cross-linked polymer is a lightly cross-linked polyferrocenylsilane (PFS).

The present invention provides a widely wavelength tunable polychrome colloidal photonic crystal device, specifically a new type of 3-D Bragg diffractive optical element in the form of a film or patterned film or shape of any dimension or array of shapes of any dimension that has a continuously and finely, rapidly and reversibly, reproducibly and predictably, adjustable photonic lattice dimension and concomitantly the predetermined ability to cause light of widely different wavelengths to be continuously and finely, rapidly and reversibly, reproducibly and predictably, and efficiently reflected or transmitted across the ultraviolet, visible and near infrared regions of the electromagnetic spectrum. The tunable polychromicity of this colloidal photonic crystal device has utility in a myriad of applications requiring wavelength tunability of light, exemplified but not limited to optical components like filters, mirrors, multiplexors, compensators, limitors and switches of use in optical telecommunication systems as well as color tunable materials of use in imaging, display, printing, fingerprinting and sensing systems.

BRIEF DESCRIPTION OF THE DRAWINGS

The methods of making a widely wavelength tunable polychrome colloidal photonic crystal device according to the present invention will now be described, by way of example only, reference being made to the accompanying drawings in which.

DETAILED DESCRIPTION OF INVENTION

As used herein, the term "metallopolymer" means a metal-containing molecule or molecular assembly having at least one type of chemical unit which repeats itself more than once, with metal atoms and/or groups of metal atoms chemically integrated into the backbone of the polymer but with the possibility that these metallopolymers could also contain metal atoms or groups of metal atoms chemically integrated into side arm functional groups of the metallopolymer or metallooligomer.

Figure 16:
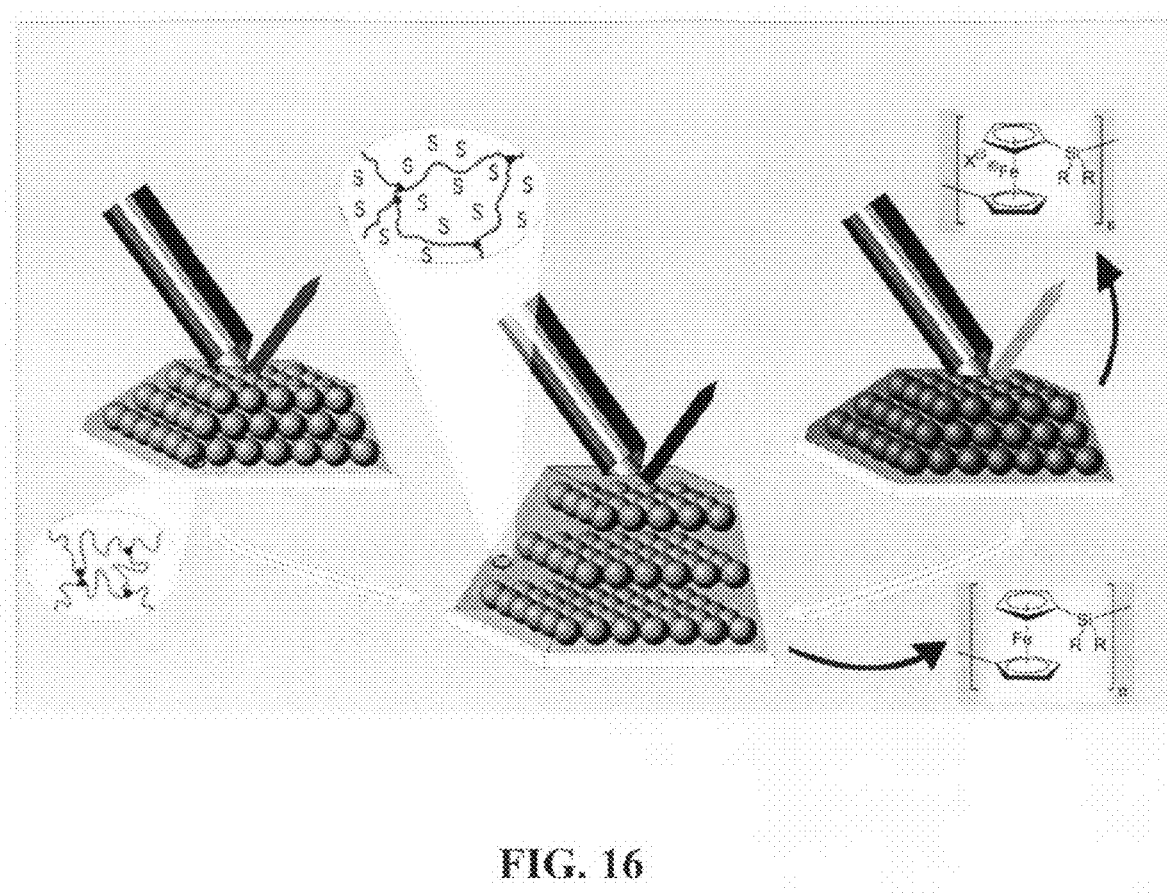
FIG. 16 is a schematic diagram of the mode of operation of the polychrome composite colloidal photonic crystal metallopolymer gel device described in this invention. The material that comprises the device, can uptake solvent in liquid or vapour form causing it to go from the left to middle in this illustration. This increases the lattice constant and red-shifts the optical Bragg diffraction wavelength. Oxidation of the material changes the properties of the material that comprises the device, causing it to shrink resulting in a blue-shift in optical Bragg diffraction wavelength as indicated on going from the middle to the right in this illustration. The illustration of the mode of operation of the device describes the behaviour of the material comprising the device when exposed to a non-polar solvent, whereas in a sufficiently polar solvent the structure would be more swollen in the oxidized state and thus oxidation would red-shift the diffraction wavelength.

In this detailed description of the invention described herein, we provide novel methods for electro-mechanically color tuning over a wide wavelength range, in a continuous and fine, rapid and reversible, reproducible and predictable manner, a synthetic composite material that is comprised of predetermined area and thickness film or patterned film or shape of any dimension or array of shapes of any dimension of a composite crosslinked metallopolymer network colloidal photonic crystal film or patterned film or shape of any dimension or array of shapes of any dimension whose polychrome optical functionality portends utility in such application areas as wavelength tunable optical telecommunication filter, mirror, multiplexor, compensator, limitor and switching as well as sensing, imaging, display and printing systems. The overall mode of operation of the widely wavelength tunable polychrome composite crosslinked metallopolymer (PFS) gel colloidal photonic crystal device described in this invention is illustrated in FIG. 16. Specifically, FIG. 16 shows a schematic diagram of the mode of operation of the polychrome composite colloidal photonic crystal metallopolymer gel device described in this invention. The material that comprises the device, can uptake solvent in liquid or vapour form causing it to go from the left to middle in this illustration. This increases the lattice constant and red-shifts the optical Bragg diffraction wavelength. Oxidation of the material changes the properties of the material that comprises the device, causing it to shrink resulting in a blue-shift in optical Bragg diffraction wavelength as indicated on going from the middle to the right in this illustration. The illustration of the mode of operation of the device describes the behaviour of the material comprising the device when exposed to a non-polar solvent, whereas in a sufficiently polar solvent the structure would be more swollen in the oxidized state and thus oxidation would red-shift the diffraction wavelength.

The present method of wavelength tuning a composite material involves producing an ordered array of microparticles having a selected refractive index embedded within a cross-linked metallopolymer network having a different refractive index, the ordered array of microparticles has a lattice spacing giving rise to Bragg reflection at a characteristic wavelength when the composite material is illuminated. The microparticles may include, but are not limited to, spheres, ellipsoids, rods, sphere containing polyhedra, cubes, and polyhedra, having cross-sectional dimensions from about 60 nanometers to about 100 micrometers. The microparticles may be made from, but not limited to, insulators, polymers, metals, and semiconductors. Preferred microparticles are monodisperse microspheres (3-5%) made of silica having diameters from about 60 nanometers to about 100 micrometers. As an alternative to solid particles, the ordered array may be formed by inverting the metallopolymer particle composite to dissolve out the particles leaving behind an array of voids in the metallopolymer, which may be filled with a suitable gas at a suitable pressure. Air has a refractive index of unity which will give a refractive index contrast with the metallopolymer making up the cross-linked polymer network.

It will be understood that when referring to "metallopolymers" the inventors also intend that the present invention may be made using metallooligomers which have a smaller number of repeat units than typical of polymers. Therefore, as far as the present invention is concerned the term "metallopolymers" also means "metallooligomers".

The microparticles are preferably formed as a thin film on a substrate which may be a metal, insulators, semiconductors, semimetals, polymers and liquids. They may be grown on the substrate surface in a pattern to form a component of a circuit, optical or electronic, depending on the application or end use of the device. The constituents may also be formed as a free-standing monolith structure, or an array of structures, in other words in the case of microspheres, a large bulk crystal may be grown and then infiltrated with the precursor to the cross linked polymer network. The microparticles themselves may be made from, but not limited to, insulators, polymers, metals, and semiconductors. Preferred are monodisperse microspheres made of silica. Both the surface of the first constituent microparticles and the surface of the arbitrary supporting substrate can be pre-treated or post-treated to increase the adhesion of the surfaces to the cross-linked metallopolymer network, for instance by anchoring a cross-linking group on these surfaces.

The cross-linked polymer network is produced using a metallopolymer having a backbone which includes metal atoms chemically integrated into the polymer backbone which may be connected together directly or through linking units. The cross-linked metallopolymer r network has an electronic configuration dependant on the metal atoms and the metal atoms are switchable between more than one electronic configuration. The cross-linked metallopolymer network being expandable and contractible in response to controlled uptake and expulsion, respectively, of fluid by the cross-linked metallopolymer network so that when the cross-linked metallopolymer network takes up the fluid it expands which shifts the Bragg reflection wavelength to longer wavelengths and when the cross-linked metallopolymer network expels the selected fluid it contracts which shifts the Bragg reflection wavelength to shorter wavelengths. The amount of fluid uptake and expulsion is controlled by controlling the electronic configuration of the cross-linked p metallopolymer network.

The switching of the electronic configuration may include changing the charge distribution in the metal-containing cross-linked metallopolymer network, including polarizing electrons in the outer orbitals with respect to the nuclei thereby varying ion, dipole, induced dipole and fluctuating dipole interactions and the like. As well, the switching of the electronic configuration of the cross-linked metallopolymer network can be performed on a localized spatial area of the cross-linked metallopolymer network, for instance by fabricating the composite material on patterned electrodes.

In a preferred embodiment of the metal containing cross-linked metallopolymer r network the different electronic configurations refers to multiple oxidation states and the metal atoms are switchable between more than one oxidation state which changes the local environment thereby giving rise to the uptake or expulsion of fluid. Thus in this case the switching electronic configuration of the cross-linked metallopolymer network includes switching a given proportion of the metal atoms from one oxidation state into another state.

The cross-linked metallopolymer network may be produced containing metal atoms including but limited to titanium, vanadium, chromium, manganese, iron, cobalt, nickel, copper, niobium, molybdenum, ruthenium, rhenium, platinum, palladium, rhodium, and zinc and combinations thereof. The preferred unit from which the material is made is a metal-containing bridged metallocenophanes containing some of the metals mentioned above, the preferred of these being iron with a silicon atom bridging the two cyclopentadienyl ligands in the case of strained sila-1-ferrocenophanes so that the cross-linked metallopolymer network is comprised of a polyferrocenylsilanes.

Sila-1-ferrocenophanes giving rise to linear metallopolymer are species including, but not limited to, dialkylsila-1-ferrocenophanes, alkylalkoxysila-1-ferrocenophanes, dialkoxysila-1-ferrocenophanes, cycloalkylsila-1-ferrocenophanes, diarylsila-1-ferrocenophanes, alkylarylsila-1-ferrocenophanes, alkylalkenylsila-1-ferrocenophanes, alkylalkynylsila-1-ferrocenophanes or combinations thereof. Sila-1-ferrocenophanes which give rise to a cross-link between polymer chains can include, but are not limited to, cyclobutylsila-1-ferrocenophane, sila-1,1'-diferrocenophane, 1,2-bis(methylsila-[1]-ferrocenophane)acetylene, 1,4-bis(methylsila-[1]-ferrocenophane)benzene, bis(methylsila-[1]-ferrocenophane)-1,4-diethynylbenzene, and 1,2-bis(methylsila-[1]-ferrocenophane)ethane or combinations thereof. These species may be polymerized thermally, or with a variety of polymerization initiators such as transition metal catalysts or carbanions or electromagnetic radiation of various wavelengths.

A cross-linked metallopolymer network may be formed using the above-mentioned metal containing monomers using a mixture of compounds including about 50-100 weight % monomer, 0-30 weight % crosslinker, and 0-20 weight % initiator. The resulting network consists of cross-linked polyferrocenylsilane, with a density of crosslinks controllable by the proportion of crosslinker in the above mixture. The porosity of the metallopolymer network may be tuned if the above mixture is diluted in an inert substance, such as a solvent, which can be removed after polymerisation.

The oxidation state of the metal may be switched by one or more of several different methods, including but not limited to the application of a stimulus such as chemical redox reactions, photochemical redox reactions, thermochemical redox reactions and electrochemical redox reactions. A thermochemical redox reaction may be effected by using a compound which fragments into reactive compounds which may be oxidizing or reducing agents, such as the thermal cleavage of peroxides giving two oxidizing oxygen-centered radicals. A photochemical redox reaction may be effected by using a compound which fragments into reactive compounds which may be oxidizing or reducing agents, such as the photocleavage of chloroform which gives rise to an oxidizing chlorine radical.

The metal atoms chemically integrated into the polymer backbone are connected together directly or through linking units or combinations thereof. For example, the metal containing polymer backbone may have periodic segments in which two or more metal atoms are bonded directly together to impart a certain set of chemical, physical, electrochemical, and electronic properties to the cross-linked polymer network. Alternatively, each metal may be spaced from its nearest neighbour by means of a linking unit. The linking units are selected to impart pre-selected chemical, physical, electrochemical, and electronic properties to the cross-linked polymer network. The linking units may include, but are not limited to, substituted or unsubstituted carbanions, conjugated carbanions, linear olefins, cyclic olefins, acetylenes, phosphines, amines, carbonyls, carbenes, alkoxides or combinations thereof.

The metal atom units chemically integrated into the polymer backbone may bear side-chain ligands which may include, but are not limited to, substituted or unsubstituted carbanions, conjugated carbanions, linear olefins, cyclic olefins, acetylenes, phosphines, amines, carbonyls, carbenes, alkoxides or combinations thereof which themselves may be bonded to metal atom units of various types.

Depending on the method of synthesis and formulation of the metallopolymer, the cross-links in the polymer network may arise to due chemical bonds, physical bonds, nanoparticles, surfaces, hydrogen bonds, coordination bonds, electrostatic interactions, hydrophobic interactions, fluorophobic interactions and phase-separated domains or combinations thereof. The cross-links in the metallopolymer network may be selected to be either electronically conducting or electronically insulating or mixtures thereof.

The wavelength tunable composite material may be produced by a) forming an ordered array of the first constituents, which displays Bragg reflection, in a cross-linked metallopolymer network precursor mixture, and then b) inducing cross-linking of the cross-linked metallopolymer network precursor mixture and converting it to a cross-linked metallopolymer network with a given number density of cross-links.

Step a) may include organizing the microparticles into an ordered array which displays Bragg reflection, and then infiltrating the cross-linked metallopolymer network precursor mixture into void spaces between the first constituents. Alternatively, step a) may include organizing the microparticles into an ordered array in the presence of the cross-linked metallopolymer network precursor mixture.

The metallopolymer network may be produced with a pre-selected number density and distribution of crosslinks throughout the composite material which can be controlled by known polymer processing conditions. For example, controlling the given number density of cross-links may be achieved by the controlled cleavage of a predetermined number of bonds in the cross-linked metallopolymer network. The controlled cleavage may be performed by electrochemically cycling between more than one predetermined electronic configurations (e.g. oxidation states) of the network.

The surface of the microparticles may be modified in a manner suitable to increase the adhesion between the first constituents and the cross-linked metallopolymer network as well as with a chosen substrate. For example, the surfaces of the microparticles may be functionalized with groups which enhance binding of the metallopolymer network to the surfaces of the microspheres as well as the surface of a chosen substrate.

The cross-linked metallopolymer network precursor mixture may be a liquid which is infiltrated into void spaces between the first constituents. Alternatively, the cross-linked metallopolymer network precursor mixture may be a solid which is heated and infiltrated into the void spaces between the first constituents as a liquid melt. The cross-linked metallopolymer network precursor mixture may be a solid which is infiltrated into the void spaces between the microparticles by sublimation. The cross-linked metallopolymer network precursor mixture may also be a solid which is infiltrated into the void spaces as a solution in a liquid. Or, the cross-linked metallopolymer network precursor mixture may be a liquid or a solid dissolved in solution and the metallopolymer network precursor mixture electrodeposited by using an oxidative potential or a reducing potential, where the application of the controlled potential causes a change in solubility in the metallopolymer network precursor mixture and results in a solid being deposited in the void spaces of the first constituents.

The composite may be produced in a manner which avoids the top surface of the array of the microparticles being overcoated by the cross-linked metallopolymer network precursor mixture by a thickness of more than the cross-sectional dimension of the first constituent particles. This can be done by pressing an elastomeric substrate against the array of first constituents infiltrated with the cross-linked metallopolymer network precursor mixture, squeezing out any excess which is not in the spaces between the first constituents themselves.

A controlled amount of polymerisation initiator may be incorporated into the cross-linked metallopolymer network precursor mixture and the cross-linking of the cross-linked metallopolymer network precursor mixture by a stimulus selected from time, change in temperature, electromagnetic radiation, chemical and electrochemical reaction.

The cross-linked metallopolymer network precursor mixture may include a pre-selected amount of an additive which is removed (for example by dissolving) after cross-linking resulting in a cross-linked metallopolymer network of pre-selected porosity. Conversely, additives may be incorporated into the cross-linked metallopolymer network following cross-linking. These can be chosen to modify the properties of the cross-linked metallopolymer network, and can include solvents, solutions, gases, solids, dyes, molecules, metal nanoclusters and semiconductor nanoclusters, macromolecules, molecule assemblies, as well as particles selected from the group of spheres, ellipsoids, rods, sphere containing polyhedra, cubes, and polyhedra, having cross-sectional dimensions from about 0.1 nanometers to about 1 micrometer, or combinations thereof.

The products, and methods used to produce these products in accordance with the present invention will now be illustrated with the following non-limiting examples which are meant to be exemplary only.

EXAMPLE 1

Synthesis of Planarized Colloidal Photonic Crystal-Metallopolymer-Gel Network

To put the present method in perspective, the materials investigated in this study are planarized composite colloidal photonic crystals comprised of an ordered fcc arrangement of sub-micrometer disconnected microspheres in a matrix of weakly crosslinked poly(ferrocenylsilane) (PFS), a swellable redox-active metallopolymer gel, that is, metallopolymer gel, K. Kulbaba, M. J. MacLachlan, C. E. B. Evans, I. Manners, *Macromol. Chem. Phys.* 202, 1768 (2001).

This new class of metallopolymer-colloidal crystal composites with metal atoms integrated directly the backbone of the metallopolymer matrix overcome deficiencies in organic polymer analogues, like the class represented by but not limited to polyacrylamides, as well as introduce additional functionality by virtue of the metal-containing metallopolymer used.

Poly(ferrocenylsilane) PFS, featured in this invention is a metallopolymer whose main chain is composed of alternating substituted silicon atoms and ferrocene groups connected at the 1- and 1'-positions of the cyclopentadiene (Cp) rings. Thermal ring-opening polymerization (ROP) of strained, ring-tilted [1]-silaferrocenophanes affords high molecular weight polymer, D. A. Foucher, B. Z. Tang, I. Manners, *J. Am. Chem. Soc.* 114, 6246 (1992). The monomer used in this example was (ethylmethyl)sila-[1]-ferrocenophane, (K. Temple, J. A. Massey, Z. Chen, N. Vaidya, A. Berenbaum, M. D. Foster, I. Manners, *J. Inorg. Organomet. Poly.* 9, 189 (1999)) bearing asymmetric substituents on the silicon atom, avoiding the possibility of micro-crystallization within the metallopolymer network. The crosslinker was sila(cyclobutyl)-[1]-ferrocenophane, constituted of two strained rings, which can both be ring-opened thermally (M. J. MacLachlan, A. J. Lough, I. Manners, *Macromolecules* 29, 8562 (1996)).

There are a wide variety of chemical modifications that can be performed on this metallopolymer system to tune its mechanical, redox and thus optical characteristics. For instance, the described crosslinker could be replaced by species giving rise to electrically conductive crosslinks. These include 1,2-bis(methylsila-[1]-ferrocenophane)acetylene, 1,4-bis(methylsila-[1]-ferrocenophane)benzene, bis(methylsila-[1]-ferrocenophane)-1,4-diethynylbenzene, 1,2-bis(methylsila-[1]-ferrocenophane)ethene.

Figure 1A:
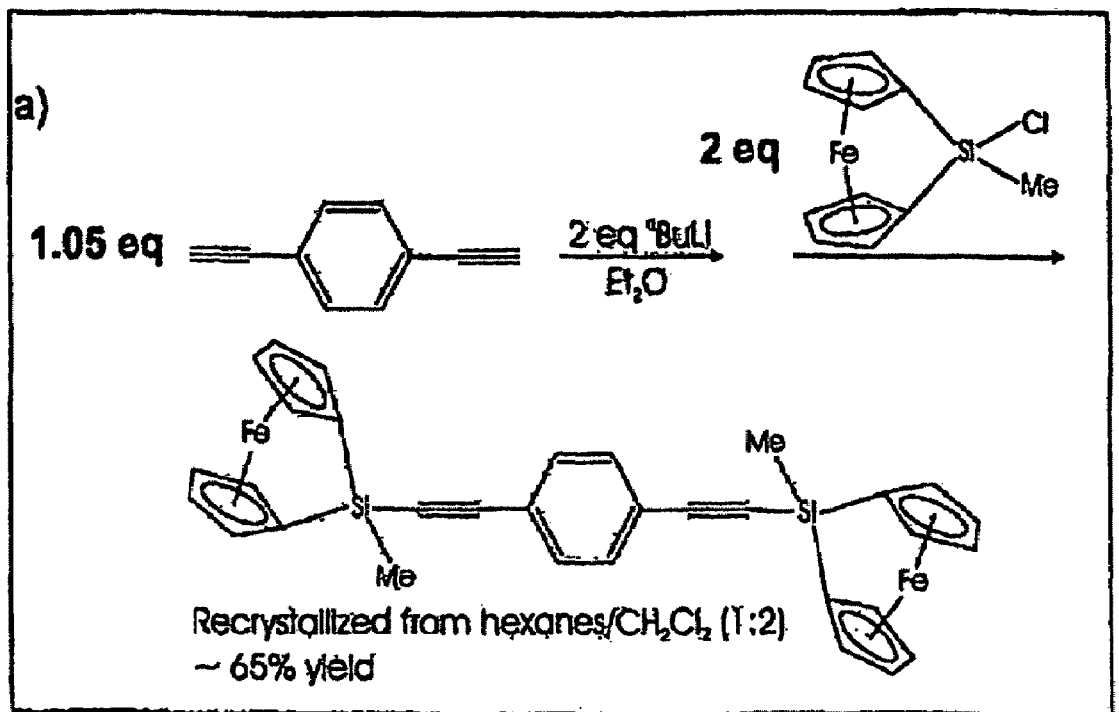
FIG. 1Aa) shows the synthesis of a next generation cross-linker for the composite silica cross-linked metallopolymer (PFS) gel colloidal photonic crystal film. The cross-linker in the new PFS comprises two polymerizable silaferrocenyl rings appended to the two ends of an electrically conductive, pi-conjugated diethynylbenzene group. b) Single crystal x-ray structure determination of the product shown in the synthetic scheme. Note that the conductive cross-links in this next generation composite silica cross-linked metallopolymer (PFS) gel colloidal photonic crystal are designed to improve the swelling and shrinking time response to an electrochemical stimulus by increasing the rate of charge-transport within the film.
Figure 1A:
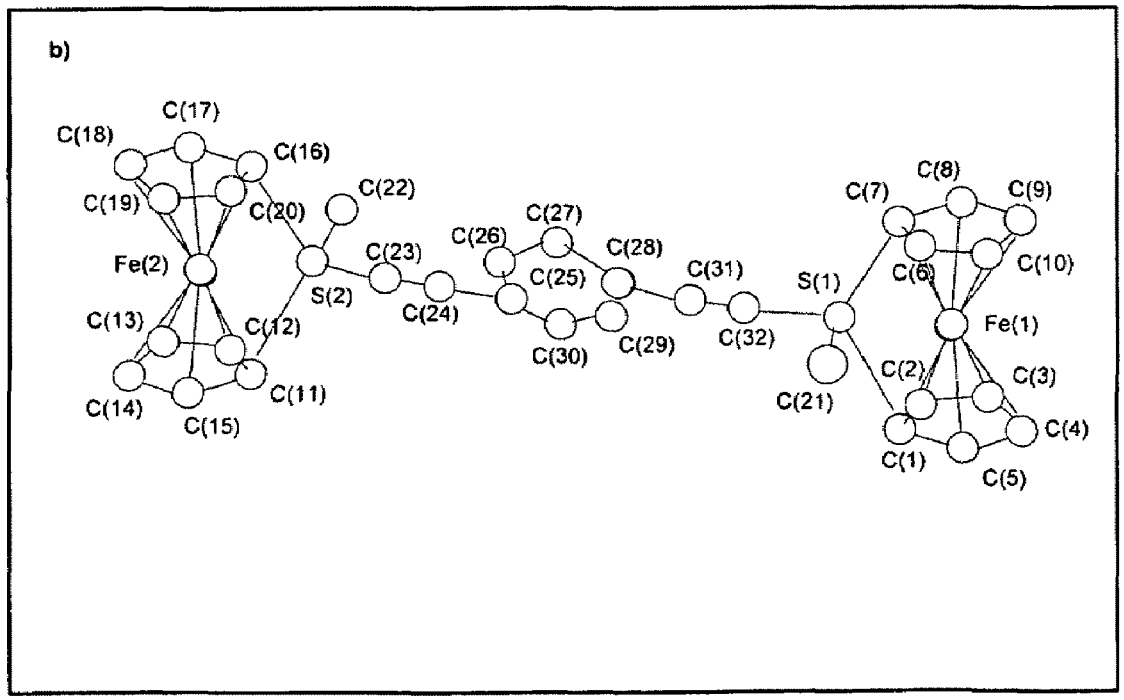

The synthesis and crystal structure of one completely new example of these is shown in FIG. 1A. More particularly, FIG. 1Aa shows the synthesis of a next generation cross-linker for the composite silica cross-linked metallopolymer (PFS) gel colloidal photonic crystal film. The cross-linker in the new PFS comprises two polymerizable silaferrocenyl rings appended to the two ends of an electrically conductive, pi-conjugated diethynylbenzene group. FIG. 1Ab) shows the single crystal x-ray structure determination of the product shown in the synthetic scheme. Note that the conductive cross-links in this next generation composite silica cross-linked metallopolymer (PFS) gel colloidal photonic crystal are designed to improve the swelling and shrinking time response to an electrochemical stimulus by increasing the rate of charge-transport within the film.

Figure 1B:
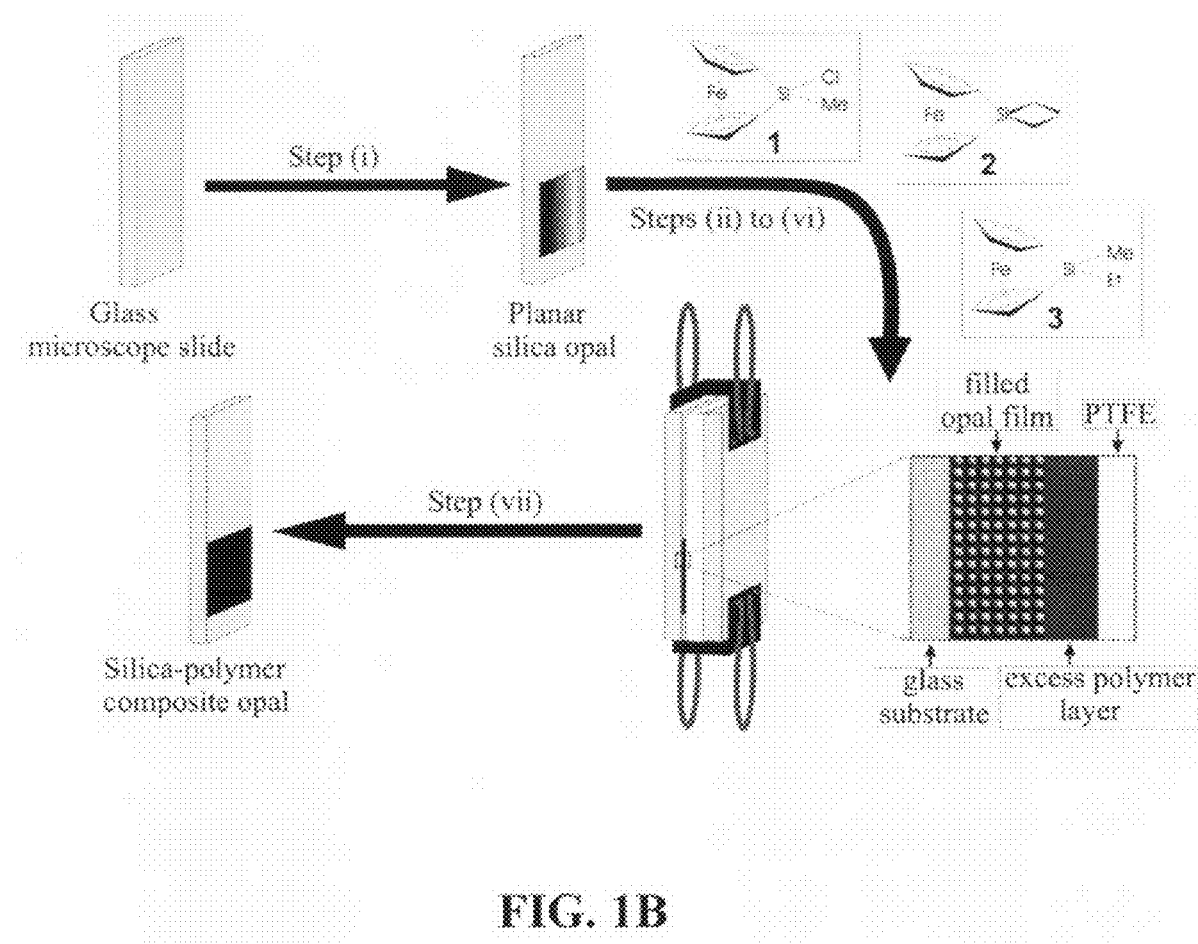
FIG. 1B shows a schematic of the process for material fabrication; (i) Evaporative deposition of silica colloids; (ii) 200° C., 12 hours, vacuum; (iii) Treatment with capping agent 1; (iv) Infiltration of monomers 2 and 3, removal of solvent at 300 mm Hg; (v) Sample covered with PTFE sheet, glass slide and bound with binder clips; (vi) 190° C., 13 hours, $N_2$; (vii) Careful removal of clips, PTFE and glass cover.

FIG. 1B shows a schematic of the steps involved in fabrication of the composite material and includes (i) evaporative deposition of silica colloids; (ii) 200° C., 12 hours, vacuum; (iii) treatment with capping agent 1; (iv) infiltration of monomers 2 and 3, removal of solvent at 300 mm Hg; (v) sample covered with PTFE sheet, glass slide and bound with binder clips; (vi) 190° C., 13 hours, $N_2$; and (vii) careful removal of clips, PTFE and glass cover.

To produce high quality colloidal photonic crystals, we start with highly monodisperse (standard deviation <2-3% of average sphere diameter) silica microspheres of 280±5 nm diameter (as measured by Scanning Electron Microscopy (SEM)) produced by the controlled hydrolysis of tetra(ethoxy)silane, (W. Stober, A. Fink, E. J. Bohn, J. Colloid Interface Sci. 26, 62 (1968)). The polydispersity was further narrowed by 2-3 fractionation steps, where the microspheres were allowed to settle slightly, and the bottom and top of the suspension were pipetted and discarded. Planar silica colloidal crystals were produced by the evaporative deposition method (P. Jiang, J. F. Bertone, K. S. Hwang, V. L. Colvin, Chem. Mater. 11, 2132 (1999)) on glass microscope slides, and the film on one side of the glass was wiped off.

Colloidal crystals could also be grown on electrically conductive substrates such as Indium-Tin Oxide (ITO) or Fluorine Tin Oxide (FTO) coated glass slides. For example, ITO-glass slides were cleaned by the standard RCA protocol (5:1:1 $H_2O:NH_3(aq):30\% H_2O_2(aq)$), and then subjected to the evaporative deposition of silica microspheres as described above. One notable modification was the addition of 0.1 mL diisopropylethylamine to the 15 mL of ethanolic sol, without which no colloidal crystal film deposited on the ITO surface. These colloidal crystals were characterized by UV-Vis-NIR spectroscopy, then dehydrated and brought into a nitrogen-filled glove box. The surface of the microspheres and substrate was then modified with chlorosilane 1 in dry hexanes, where displacement of the chlorine by silica silanol groups produces a surface layer of polymerizable groups (D. L. Zechel, K. C. Hultszch, R. Rulkens, D. Balaishis, Y. Ni, J. K. Pudelski, A. J. Lough, I. Manners, D. A. Foucher, Organometallics 15, 1972 (1996)).

Alternatively, compound 1 can be replaced with crosslinker 2, which reacts with the surface silanol groups to form a surface tethered layer of polymerizable silacyclobutyl groups. This step is essential to obtain a colloidal crystal material with good adhesion to the substrate. A very concentrated solution of 10 wt % crosslinker 2 and 90 wt % monomer 3 in dry benzene was then dropped onto the colloidal crystal film, and the solvent was removed by drying in partial vacuum. The sample, a sheet of clean, polished poly(tetrafluoroethylene) (PTFE; Teflon®) and another glass slide are bound together with binder clips, and the sample thermally polymerized. Careful separation of the assembly yielded the desired silica-PFS composite colloidal crystal film, which was soaked in tetrahydrofuran (THF) overnight to remove any oligomers not polymerized into the PFS network.

Figure 2:
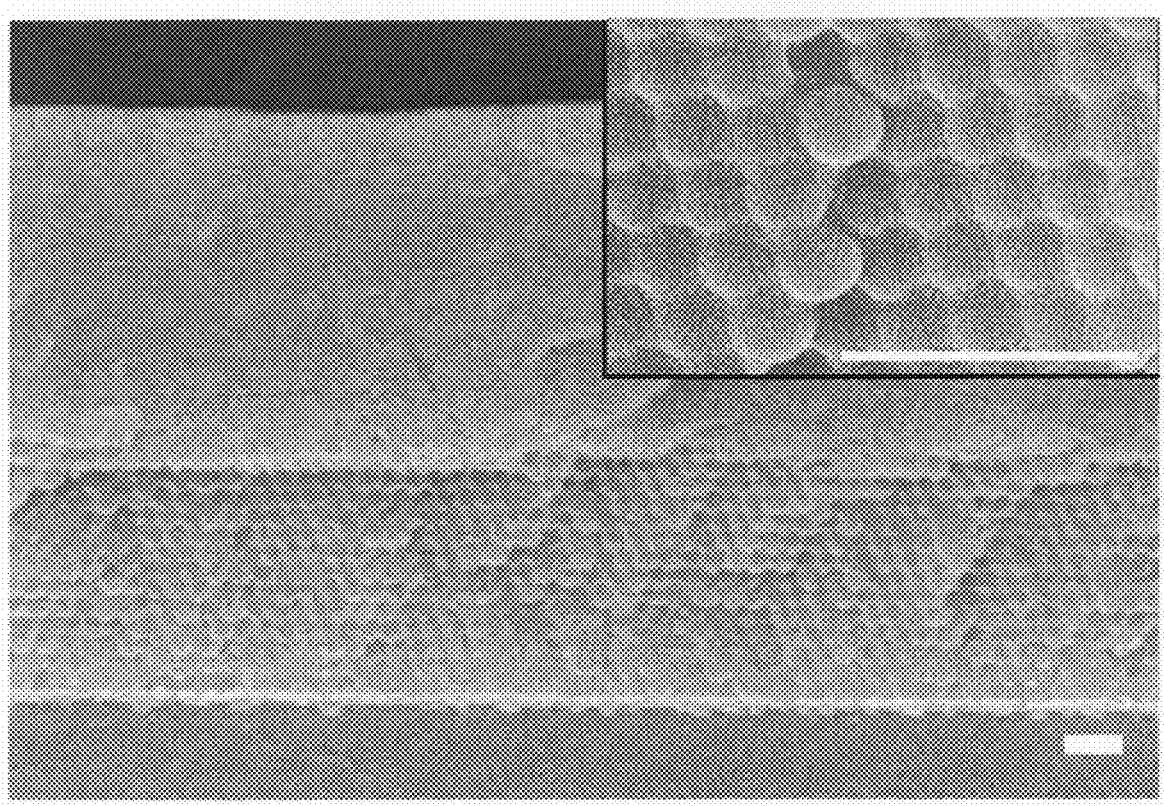
FIG. 2 shows a Scanning Electron Micrograph (SEM) image of a cross-section of the composite silica crosslinked metallopolymer (PFS) gel colloidal photonic crystal film showing the glass substrate, the infiltrated colloidal crystal, and the bulk metallopolymer (PFS) overlayer. The inset shows a magnified view of (111) crystal planes exposed during sample cleavage, confirming the face-centered cubic (fcc) arrangement of microspheres in these colloidal crystals.

A cross-sectional SEM image of one sample is shown in FIG. 2. This SEM image of a cross-section of the composite silica crosslinked metallopolymer (PFS) gel colloidal photonic crystal film shows the glass substrate, the infiltrated colloidal crystal, and the bulk metallopolymer (PFS) overlayer. The inset shows a magnified view of (111) crystal planes exposed during sample cleavage, confirming the face-centered cubic (fcc) arrangement of microspheres in these colloidal crystals.

Variants of this method have been used to improve, notably, the mechanical stability of the samples upon cycling. Upon infiltration and drying of the monomers as described above, the PTFE cover and glass slide are replaced by a glass slide sputter-coated with 6000 Angstroms of copper metal, the copper coating facing the colloidal crystal sample. The assembly is bound with binder clips, and the sample thermally polymerized at a nitrogen partial pressure of 100-150 Torr for 15 hours at 190° C. Following polymerization, the top glass cover can be easily separated, and the exposed copper coating etched in 10 minutes with an aqueous solution of $FeCl_3$ and $NH_4Cl$.

As well, controlled amounts of PFS homopolymer (various alkyl groups on the backbone silicon atoms) can be incorporated into the film along with monomers during the infiltration step. The inclusion of polymer has two functions, the first being to aid in the infiltration step by conferring to the monomer/crosslinker solution enhanced viscosity and lowered tendency to crystallize, both resulting in more even and reproducible infiltration. As well, the washing step serving to remove unreacted oligomers will also remove the incorporated homopolymer, providing a readily tunable porosity. This allows one to tune optical properties through control of filling fraction, and kinetic response by increasing free volume in the polymer network.

EXAMPLE 2

Figure 7:
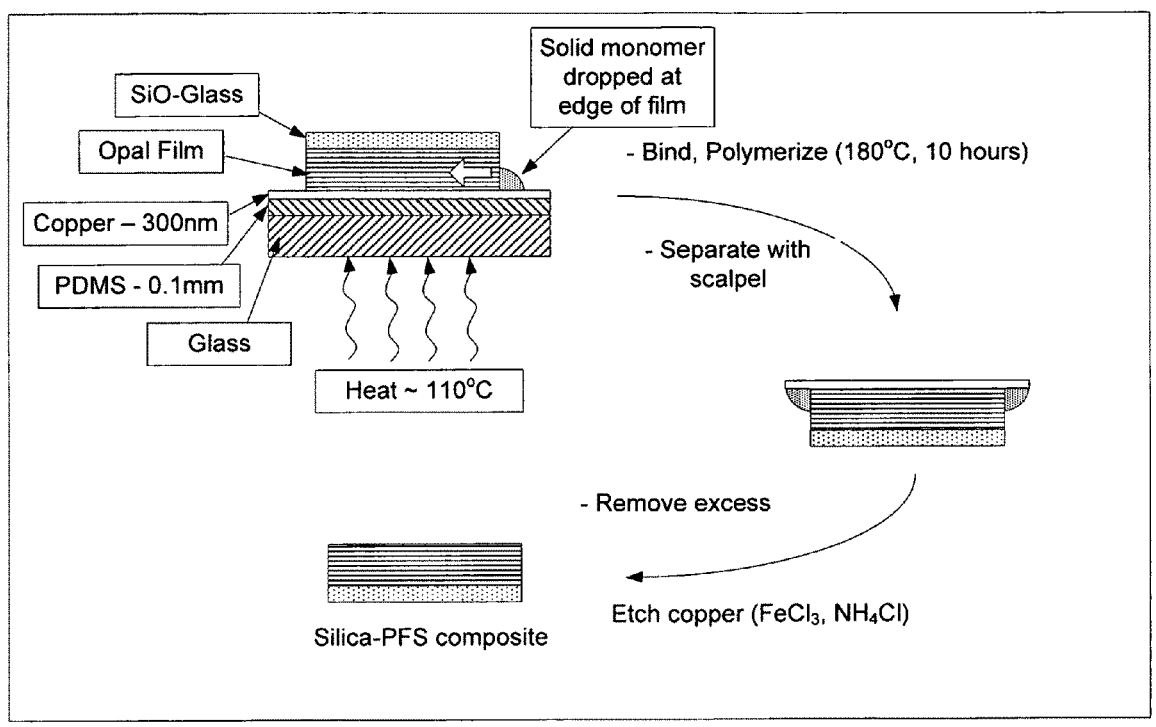
FIG. 7 shows a schematic of second-generation composite silica crosslinked metallopolymer (PFS) gel colloidal photonic crystal film sample fabrication. A colloidal crystal film grown by evaporative deposition of silica colloids is placed face down on a composite substrate made by sputtering a 75-300 nm film of copper onto a 0.1 mm thick PDMS film on a glass microslide. The assembly is heated to approximately 110° C. and a mixture of monomer and crosslinker are placed at the film edge, allowed to melt and imbibe the colloidal crystal film by capillary action. Alternatively, the monomer and crosslinker are allowed to melt on the copper coated substrate and the colloidal crystal film is pressed against the molten droplet, which infiltrates the colloidal crystal film. The composite substrate and colloidal crystal film are then bound together with binder clips, and thermally polymerized at 180° C. for 10-12 hours. The sample is then separated with a scalpel' which breaks the copper-PDMS interface. The copper is then etched for 5 minutes in a iron trichloride/ammonium chloride/water bath.

Synthesis of Planarized Colloidal Photonic Crystal-Metallopolymer-Gel Network without Polymer Overlayer, by Melt Infiltration The method detailed here describes the fabrication of planarized composite colloidal photonic crystals consisting of an ordered fcc arrangement of sub-micrometer disconnected silica spheres in a matrix of weakly crosslinked PFS as per Example 1. In the previous example the material is produced with a polymer overlayer of variable thickness, whereas in this example the polymer overlayer is reproducibly less than a sphere diameter. A schematic of the procedure is shown in FIG. 7. This first step consists of cleaning a glass microslide by sonication in acetone followed by water. It is then placed on a silicon wafer, which has been cleaned in piranha (see previous example), water, then dried and exposed to perfluorooctyltrichlorosilane to make it non-adhesive. Glass microslips of 0.1 mm thickness are used as spacers between the glass slide and the silicon wafer. A liquid PDMS prepolymer is poured onto the assembly, the air removed by vacuum, and the whole is placed in a oven at 60° C. for 24 hours to cure the PDMS. The silicon wafer is lifted off, leaving the glass slides with a 0.1 mm thick film of PDMS, onto which is sputtered between 75 and 300 nm of copper metal.

Next, a colloidal crystal film as prepared by the method described in example 1 is treated with the crosslinker 2 in dichloromethane, using a 1-10 mol % of 4-dimethylaminopyridine as catalyst. The film is then washed well in dichloromethane and dried. The copper coated composite substrate as describe above is then placed copper side up onto a hot plate in a nitrogen-filled glove box, with the hot plate set at a temperature of between 50 and 130° C. Approximately 50 mg of a solid mixture of monomer 1 and crosslinker 2, typically 10 weight % of 1 in 2, is then placed on the copper and allowed to melt. As soon as the mixture is molten, the prepared colloidal crystal film, which has also been allowed to equilibrate at the melting temperature, is pressed colloidal crystal side down against the copper. The assembly is quickly bound together with fold back binder clips, and polymerized under nitrogen at 180-200° C. for 10-20 hours.

Figure 8:
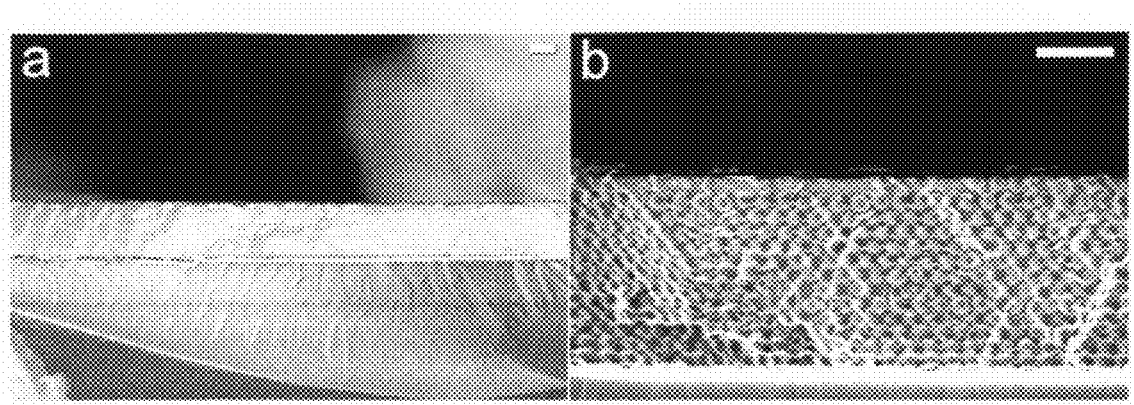
FIG. 8 shows SEM images of second-generation composite silica crosslinked metallopolymer (PFS) gel colloidal photonic crystal film samples. a) Low-resolution image of film cross-section. b) High-resolution image of cross-section. Both white scale bars represent 1 micrometer. Note the absence of an overlay of the infiltrated PFS on the top surface of the colloidal crystal film.

After polymerization, the assembly is removed from the furnace, the clips removed, and a scalpel blade used to pry apart the colloidal crystal film and copper coated substrate. In this way, a planarized composite colloidal photonic crystals consisting of an ordered fcc arrangement of sub-micrometer disconnected silica spheres in a matrix of weakly crosslinked PFS is obtained, where the copper film originally on the PDMS has been transferred to the top of the planarized photonic crystal. The copper-coated film is then agitated in a solution of typically 0.2 g $FeCl_3$ and 3 g $NH_4Cl$ in 150 mL distilled water for 5 minutes, which etches away the copper. A cross-sectional image of one of these samples is shown in FIGS. 8a) and 8b) in which FIG. 8a) shows a low-resolution SEM image of the film cross-section and FIG. 8b) shows a high-resolution SEM image of the film cross-section. Both white scale bars represent 1 micrometer. Note the absence of an overlay of the infiltrated PFS on the top surface of the colloidal crystal film. FIGS. 8a) and 8b) demonstrate that the film is fully filled with no excess polymer over-layer. The role of the PDMS in this process is to ensure conformal pressure against the sample surface, and provides greater tolerance to adventitious particulate matter.

EXAMPLE 3

Optical Properties of Liquid Solvent Tunable Planarized Colloidal Photonic Crystal-Metallopolymer-Gel Network Optical properties of both dry and solvent soaked samples were measured in a standard IR cell mounted with a rectangular quartz plate, PTFE spacer and a quartz plate with 2 drilled holes allowing for injection and removal of solvent, squeezed together by a metal frame with a window and tightening screws. A 0.3 mm aperture was affixed to the cell in order to obtain spectra of a small sample area. Spectra were collected using a UV-vis-NIR spectrometer (Perkin-Elmer Lambda 900 model), orienting the sample (111) surface perpendicular to the incident beam using alignment marks. A portion of the experimentally obtained spectra is shown in FIG. 3(a). The peak shown represents selective reflection of a narrow band of wavelengths due to optical Bragg diffraction from the (111) planes of the colloidal photonic crystal, and the secondary maxima on either side of the main peaks are due to interfering reflections from the top and bottom of the sample (Fabrey-Perot fringes).

In order to estimate the effect of the swelling on the structure of the colloidal photonic crystal, the results of the optical characterization were analyzed employing a theoretical model based on a scalar wave approximation (K. W.-K. Shung, Y. C. Tsai, Phys. Rev. B 48, 11265 (1993)). This simple model has been proven to be valid to describe the transmittance and reflectance of finite size photonic crystals at the spectral region corresponding to that of lower energy photonic bands such as the ones we investigate here (I. Tarhan, G. H. Watson, Phys. Rev. B 54, 7593 (1996), J. F. Bertone, P. Jiang, K. S. Hwang, D. M. Mittleman, V. L. Colvin, Phys. Rev. Lett. 83, 300 (1999), H. Miguez, S.-M. Yang, G. A. Ozin, Appl. Phys. Lett., 81, 2493-95 (2002), and Y. A. Vlasov, M. Deutsch, D. J. Norris, Appl. Phys. Lett. 76, 1627 (2000)).

In the present case, knowing the refractive index of both the silica microspheres and the infiltrated cross-linked polymer, n=1.425 and n=1.65 respectively (F. Garcia-Santamaria, H. Miguez, M. Ibisate, F. Meseguer, C. Lopez, Langmuir 18, 1942 (2002), and J. Galloro, M. Ginzburn, H. Miguez, S. M. Yang, N. Coombs, A. Safa-Sefat, J. E. Greedan, I. Manners, G. A. Ozin, Adv. Funct. Mater. 2002, 12, 382) as well as that of the solvent, we are able to obtain the increase of the (111) interplanar distance d(111) resulting from the swelling process. We take into account the variation of the refractive index of the colloidal photonic crystal interstitial sites due to incorporation of the solvent into the polymer network when the swelling occurs.

Figure 3:
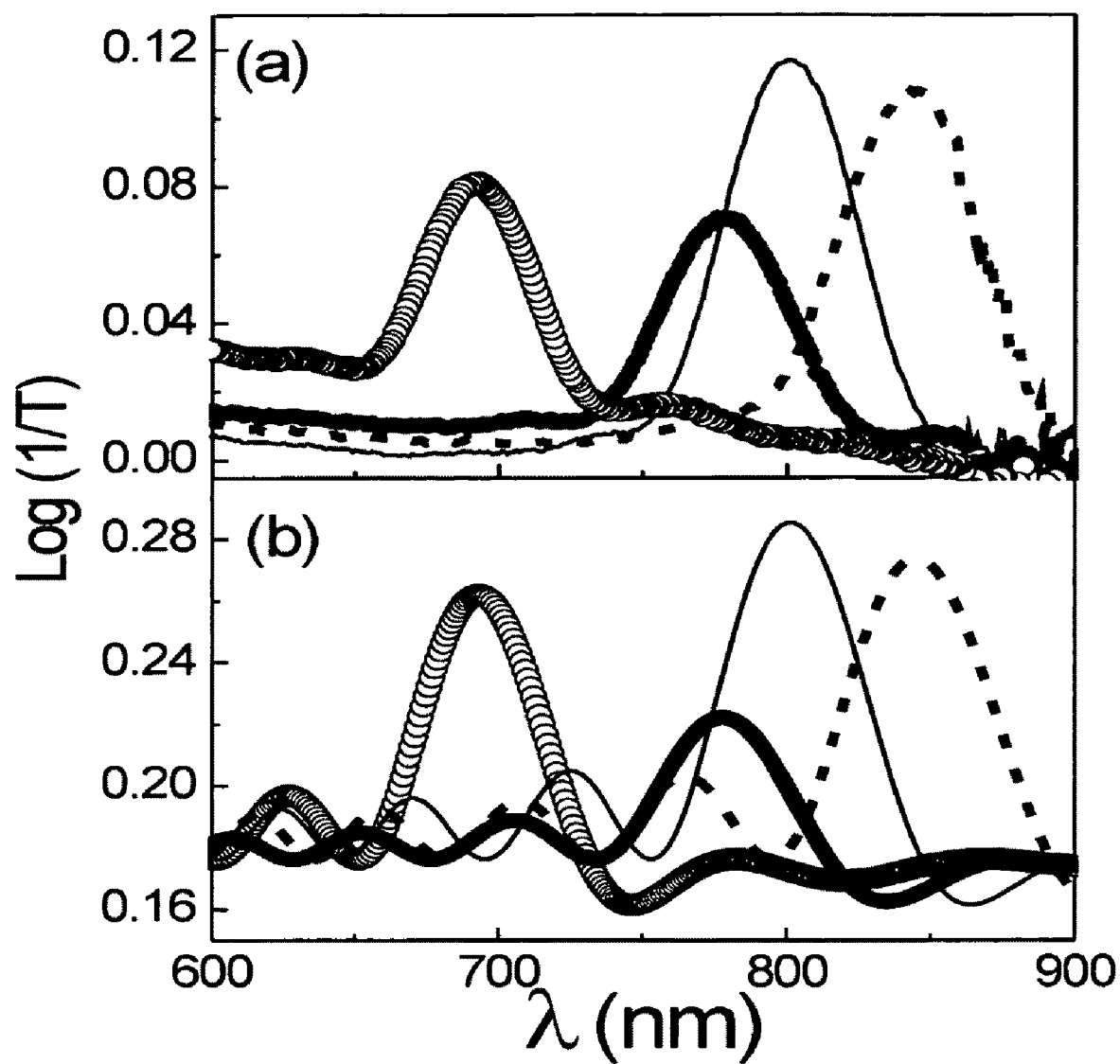
FIG. 3(a) shows experimental transmission spectra of the same silica-cross linked gel colloidal photonic crystal soaked with solvents of different solubility parameter and refractive index. Circles: sample prior to solvent infiltration. Thick solid line: methyl cyclohexane, n=1.422, $\delta_s$=16. Thin solid line: benzonitrile, n=1.528, $\delta_s$=17.2; Dashed line: Chlorobenzene, n=1.524, $\delta_s$=19.4.
FIG. 3(b) shows the corresponding simulated spectra calculated using a scalar wave approximation. The colloidal photonic crystal size was considered to be 11 (111) microsphere layers, accordingly to SEM analysis of the films. The position, width and intensity observed experimental were fitted having as the only variable parameter the (111) interplanar distance. By so doing, we can estimate the degree of swelling due to each solvent.

We also include the presence of a substrate (glass slide) and a superstrate (polymer excess, see FIG. 2) of different refractive index (D. M. Mittleman, J. F. Bertone, P. Jiang, K. S. Hwang, V. L. Colvin, J. Chem. Phys. 111, 345 (1999).). By using this approach, we fit the simulated reflectance spectra to the experimental ones considering d(111) as the only adjustable parameter. At the same time, we reproduce the particular optical features observed for each one of the solvents, such as reflectance peak width, position and intensity. FIGS. 3$a$ and 3$b$ summarizes the main results of the fitting. FIGS. 3$a$ and 3$b$ show, respectively, experimental and theoretical results for the starting dry polymer-silica colloidal crystal composite, and the same film while soaked in various solvents. More particularly, FIG. 3($a$) shows experimental transmission spectra of the same silica-cross linked gel colloidal photonic crystal soaked with solvents of different solubility parameter and refractive index. Circles: sample prior to solvent infiltration. Thick solid line: methyl cyclohexane, n=1.422, $\delta_s$=16. Thin solid line: benzonitrile, n=1.528, $\delta_s$=17.2; Dashed line: Chlorobenzene, n=1.524, $\delta_s$=19.4. FIG. 3($b$) shows the corresponding simulated spectra calculated using a scalar wave approximation. The colloidal photonic crystal size was considered to be 11 (111) microsphere layers, accordingly to SEM analysis of the films. The position, width and intensity observed experimental were fitted having as the only variable parameter the (111) interplanar distance. By so doing, we can estimate the degree of swelling due to each solvent.

Figure 4:
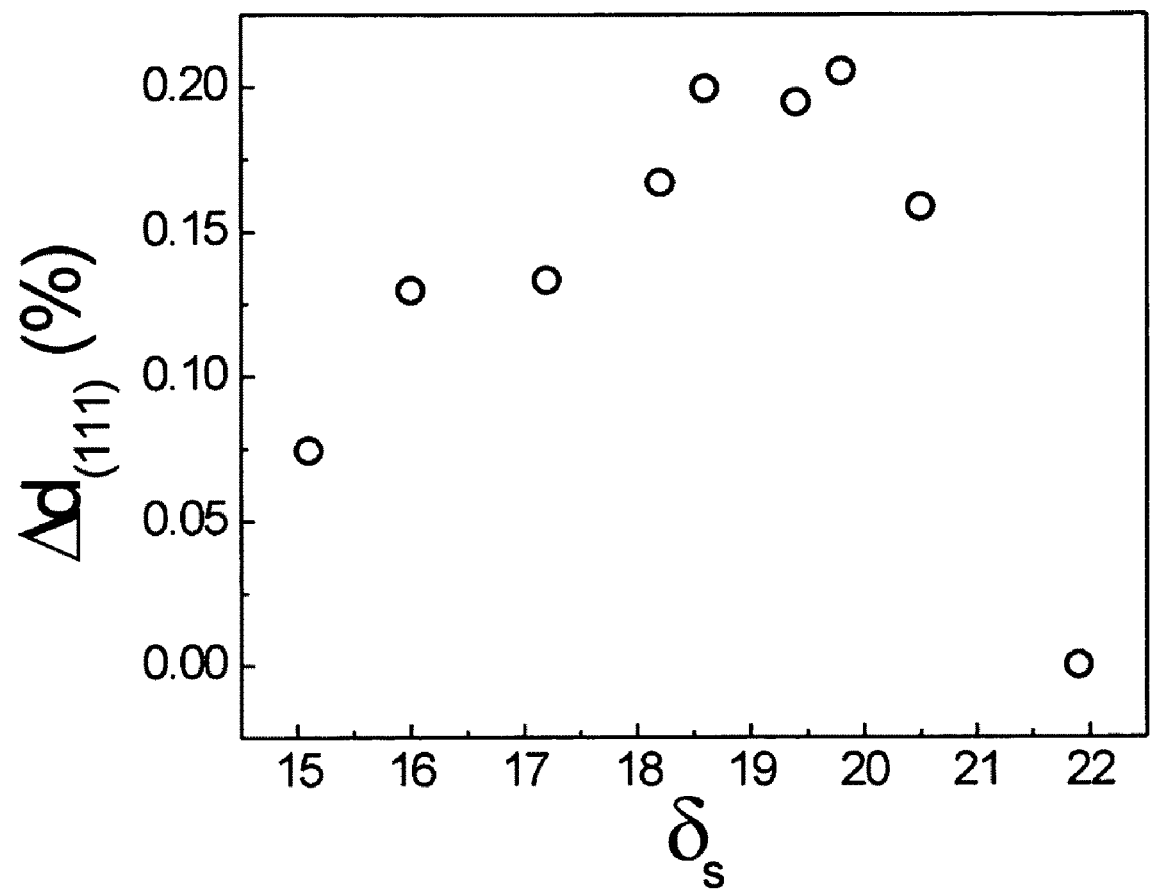
FIG. 4 shows the variation of the (111) interplanar distance versus the solubility parameter of different solvents, extracted from the fitting of the optical data for the composite silica crosslinked metallopolymer (PFS) gel colloidal photonic crystal film shown in FIG. 3. These results coincide qualitatively with previously reported studies of the swellability of the same type of pure bulk form of the metallopolymer gel performed by weight differential measurements.

Both the model and the experiment show explicitly how it is possible, by choosing the appropriate pair of solvents, to modulate the width of the photonic stop band keeping the spectral position of the maximum constant (results not shown). This is a consequence of the double character of the tuning process. On one side, the distance between microspheres increases during the swelling, which enlarges the lattice constant and simultaneously decreases the filling fraction of the silica microspheres in the structure. On the other hand, the refractive index contrast between microspheres and background is modified as a result of the incorporation of the solvent into the polymer network. The values of d(111) attained from this simulation are plotted versus the solubility parameter $\delta$ of the solvents in FIG. 4. Specifically, FIG. 4 shows the variation of the (111) interplanar distance versus the solubility parameter of different solvents, extracted from the fitting of the optical data for the composite silica crosslinked metallopolymer (PFS) gel colloidal photonic crystal film shown in FIG. 3. These results coincide qualitatively with previously reported studies of the swellability of the same type of pure bulk form of the metallopolymer gel performed by weight differential measurements.

The solubility parameter is a numerical value empirically describing the behavior of a specific solvent (J. H. Hildebrand, R. L. Scott, "The Solubility of Non-Electrolytes", 3rd ed. Rienhold Publishing Corporation New York (1950); Dover Publications Inc. New York (1964)). It can be seen that a precise tuning of the intermicrosphere distance is achieved. It is worth mentioning that similar curves, although with much less resolution, have been obtain using the weight-difference technique (K. Kulbaba, M. J. MacLachlan, C. E. B. Evans, I. Manners, Macromol. Chem. Phys. 202, 1768 (2001)), these results being in good agreement with those herein presented.

A cross-linked polymer network cannot dissolve in any solvent, because the presence of crosslinks creates a "super-molecule" of effectively infinite molecular weight. Such a structure can absorb solvent, in order to maximize thermodynamically favorable contacts, but as the chains between crosslink points stretch out they pay an entropic price given a decrease in available degrees of freedom (P. J. Flory, "Principles of Polymer Chemistry", Cornell Univ. Press, New York (1953)). Therefore, the degree of swelling of a polymer gel can depend on a variety of factors influencing solvent-polymer interactions (S. H. Gehrke, Adv. Polym. Sci. 110, 81 (1993)), making these systems inherently tunable. In the material we are studying, the greater the value of d(111), the more favorable is the solvent-polymer interaction permitting the determination of the polymer solubility parameter on this basis.

Swelling in these samples is not limited to solvents in the liquid phase. Solvent vapors as described in this invention could also effect the said lattice dimension changes, with a potentially much faster response given the higher mobility of solvent molecules and the elimination of liquid-solid or liquid-gas interfaces which could limit response speed.

EXAMPLE 4

Figure 5:
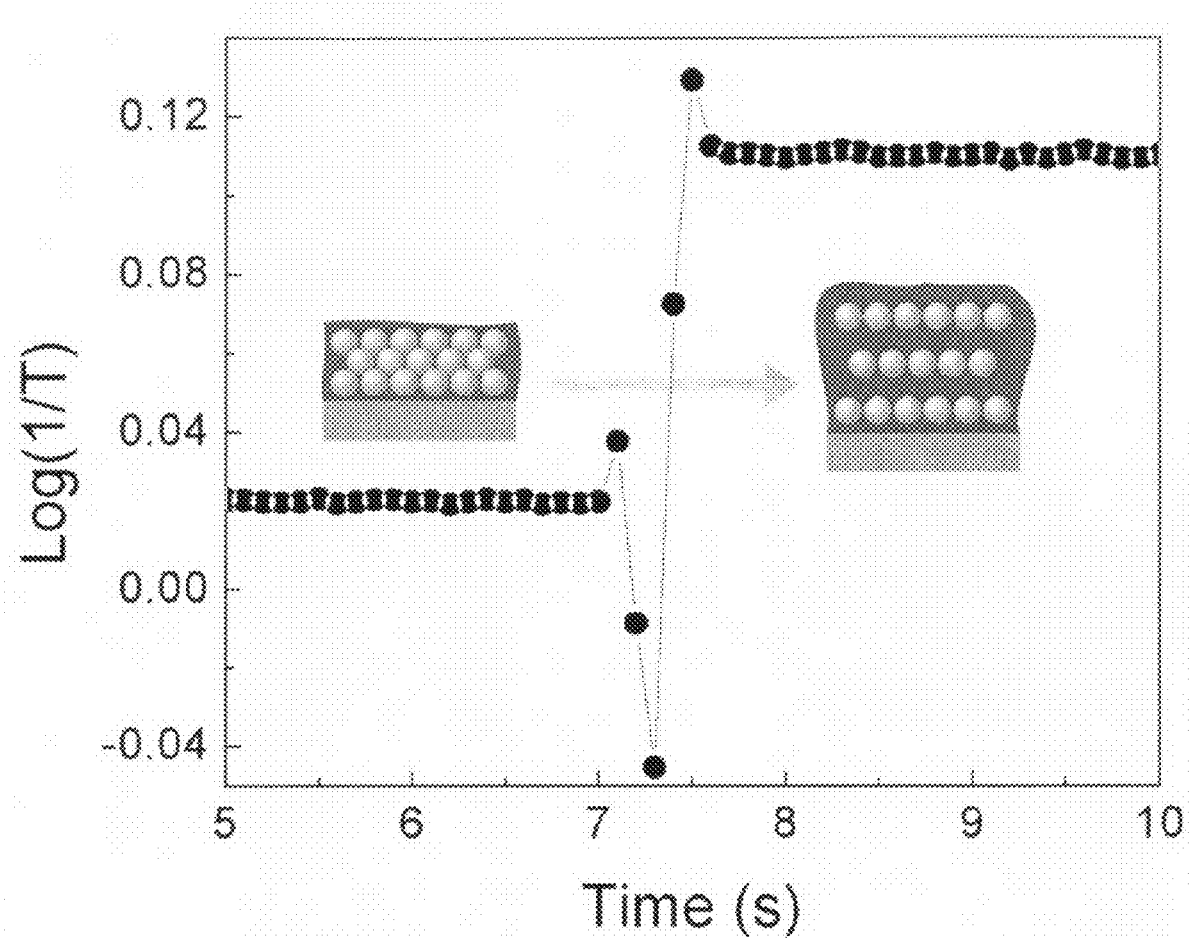
FIG. 5 is a graphical representation showing the time response of the composite silica crosslinked metallopolymer (PFS) gel colloidal photonic crystal film, upon exposure to liquid carbon disulfide. The plot represents the absorbance at 843 nm plotted against time (0.1 second intervals), with this wavelength representing the maximum in intensity for the first stop band of the sample when swollen in carbon disulfide. Before starting the measurement, a background was taken of the dry sample to obtain a low initial absorbance value. As can be seen, the sample reaches its equilibrium swelling value within 0.2 to 0.4 seconds.

Temporal Optical Response to Liquid Solvent of Planarized Colloidal Photonic Crystal-Metallopolymer-Gel Network A kinetics experiment was conducted to evaluate the response speed of the polymer-silica colloidal photonic crystal composite material upon exposure to solvent, with the results of the experiment shown in FIG. 5. FIG. 5 shows a graphical representation showing the time response of the composite silica crosslinked metallopolymer (PFS) gel colloidal photonic crystal film, upon exposure to liquid carbon disulfide. The plot represents the absorbance at 843 nm plotted against time (0.1 second intervals), with this wavelength representing the maximum in intensity for the first stop band of the sample when swollen in carbon disulfide. Before starting the measurement, a background was taken of the dry sample to obtain a low initial absorbance value. As can be seen, the sample reaches its equilibrium swelling value within 0.2 to 0.4 seconds.

In order to determine when the sample had reached its fully swollen state, the maximum in intensity of the first Bragg peak of the swollen sample was first noted. This wavelength was then monitored with respect to time, and carbon disulfide was injected into the cell. Before injecting the solvent, the absorbance value was low since a background had been taken of the dry sample, and this value was constant from 0 to 7 seconds.

We see then a brief increase, which is due to scattering by the air-liquid interface created by the solvent rising in the sample cell and crossing the incident beam. Next, we see a sharp drop in absorbance due to a decrease in refractive index contrast between the fluid content of the cell (solvent instead of air) and the quartz plates (nquartz/nair=1.54; ncarbon disulfide/nquartz=1.06), as well as with the glass substrate ($\Delta$nold=1.45; $\Delta$nnew=1.12) and PFS superstrate ($\Delta$nold=1.65; $\Delta$nnew=1.01). This decreases the light reflected at these interfaces and results in more light reaching the detector. After this decrease in intensity we see a rapid increase representing the swelling event, after which the sample attains a constant steady state absorbance value. The whole process, from initial injection of solvent onto the dry polymer-silica colloidal photonic crystal sample to the completely swollen state, occurs in 0.2-0.4 seconds.

EXAMPLE 5

Optical Properties of Solvent Vapor Tunable Planarized Colloidal Photonic Crystal-Metallopolymer-Gel Network To evaluate the response of planarized colloidal photonic crystal-metallopolymer-gel network samples to solvent vapor, a specialized optical cell was constructed. The sample holder consisted of an optical cuvette measuring 5 cm×10 cm×20 cm with an open top. The top of the optical cuvette was sealed against a main chamber fitted with a pressure gauge. From the chamber extended two glass tubes both fitted with two glass stopcocks, leaving a small volume of glass tubing, which could be filled with solvent vapor or evacuated under vacuum. The setup allowed for solvent vapor to be gradually or quickly introduced into the sample cell, and for vacuum to be applied in small increments or all at once.

Figure 9:
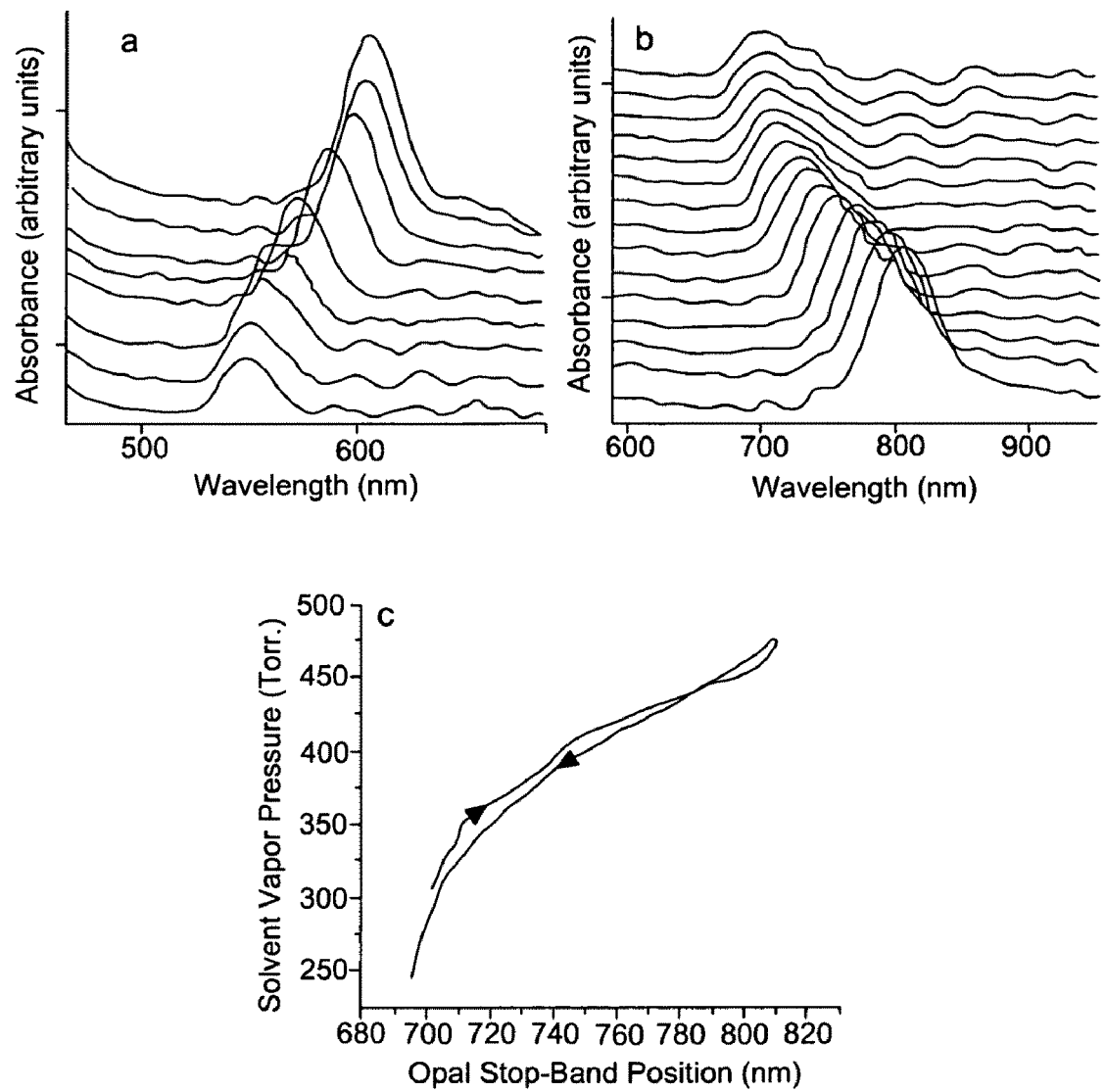
FIG. 9 shows the optical response of a composite silica crosslinked metallopolymer (PFS) gel colloidal photonic crystal film sample, exposed to solvent vapour. Using a custom-built optical cell, optical properties of samples were probed while monitoring the vapour pressure of carbon disulfide used as a sample solvent. a) Optical spectra of the sample exposed to increasing pressure of solvent vapour, starting from the bottom plot. b) Optical spectra of the sample exposed to decreasing pressure of solvent vapour, starting from the bottom plot. c) Position of the stop-band of the sample vs. the vapour pressure of solvent for increasing and decreasing vapour pressure (indicated by black arrows), note the absence of hysteresis in the stop band wavelength as the solvent vapor pressure is changed.

Carbon disulfide was chosen as a test solvent to demonstrate the vapor swelling behaviour of the samples. Small amounts of solvent were iteratively loaded into the side chambers of the apparatus, and this side chamber open to the main chamber, which was under static vacuum. The optical spectra at a direction perpendicular to the substrate normal were monitored upon each cycle of increasing solvent vapour pressure. The results for the vapor swelling tests, are shown in FIG. 9a which shows the optical spectra of the sample exposed to increasing pressure of solvent vapour, starting from the bottom plot. Conversely, to monitor the deswelling of the samples the side chamber could be placed under vacuum and this evacuated space equilibrated with the main chamber by opening the stopcock separating them, allowing the slow lowering of the pressure in the main chamber. The results of the deswelling experiment are shown in FIG. 9b) which shows the optical spectra of the sample exposed to decreasing pressure of solvent vapour, starting from the bottom plot.

The full result of the experiment is shown in FIG. 9c, where the peak wavelength of the stop-band of the sample is plotted against the solvent vapour pressure in the main chamber. FIG. 9c shows the position of the stop-band of the sample vs. the vapour pressure of solvent for increasing and decreasing vapour pressure (indicated by black arrows), note the absence of hysteresis in the stop band wavelength as the solvent vapor pressure is changed. There seems to be very little hysteresis in the peak-pressure plot, indicating a well-controlled reversible process. As well as small iterative fillings, the sample could be fully swollen in a single step by loading the side chamber with a large concentration of solvent vapour. Full deswelling could be achieved by opening the main chamber to dynamic vacuum.

EXAMPLE 6

Figure 10:
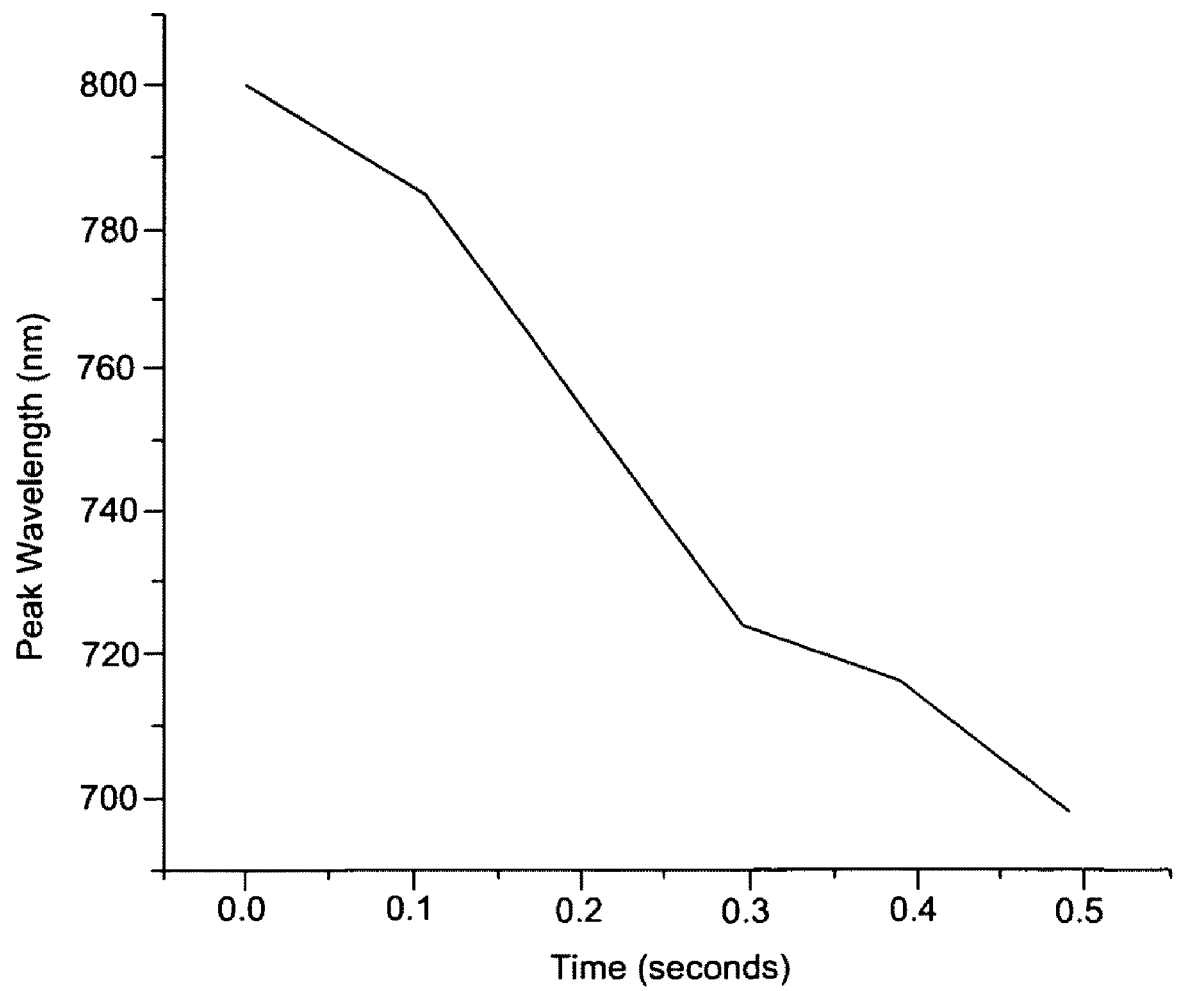
FIG. 10 shows deswelling kinetics of a solvent vapour swollen composite silica crosslinked metallopolymer (PFS) gel colloidal photonic crystal film sample exposed to vacuum. Note the sub-second time response of the system.

Temporal Optical Response to Solvent Vapour of Planarized Colloidal Photonic Crystal-Metallopolymer-Gel Network To further investigate the speed and degree of switching of the planarized colloidal photonic crystal-metallopolymer-gel network to vapors, kinetic studies were undertaken using a CCD array fiber-optic spectrometer capable of capturing an entire spectrum in 0.1 seconds. After fully swelling the sample in solvent vapor, dynamic vacuum was applied and the optical properties monitored in situ. The result of the kinetics experiment is shown in FIG. 10, which show the deswelling kinetics of a solvent vapour swollen composite silica crosslinked metallopolymer (PFS) gel colloidal photonic crystal film sample exposed to vacuum. Note the sub-second time response of the system. It can be seen From FIG. 10 that the sample goes from the fully swollen to fully deswollen state in 0.5 seconds. The peak shift rate is thus in this example on the order of 200 nm/sec.

EXAMPLE 7

Figure 6:
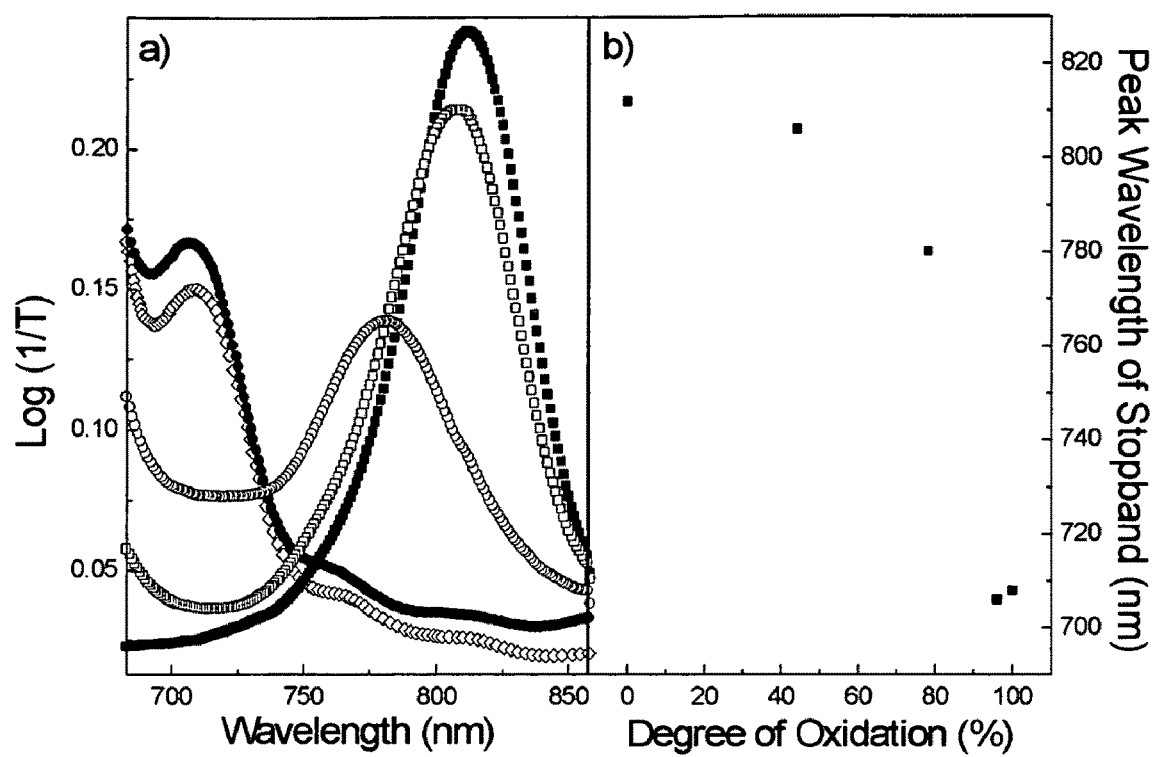
FIG. 6(a) shows a plot showing the spectra obtained for the same composite silica crosslinked metallopolymer (PFS) gel colloidal photonic crystal film sample with different degrees of oxidation after swelling the sample in carbon disulfide n=1.627, $\delta_s$=20.5. The order of spectra, from least to most oxidized is: Solid squares; Empty squares; Empty circles; Solid circles; Empty diamonds. (b) The maximum values of the Bragg diffraction peaks shown in (a) plotted against the degree of polymer oxidation calculated from the intensity of the metallopolymer backbone ferrocenium ligand-to-metal-charge-transfer (LMCT) band maximum at 635 nm. The degree of oxidation of the metallopolymer is an estimate since it was calculated assuming a constant background level.

Optical Properties of Chemically Redox Tunable Planarized Colloidal Photonic Crystal-Metallopolymer-Gel Network PFS is composed of a backbone of redox-active ferrocene groups, and consequently the polymer itself is redox-active. Charges on the iron atoms are delocalized over the polymer chain via the Cp $\pi$-clouds and silicon electronic orbitals (R. Rulkens, A. J. Lough, I. Manners, S. R. Lovelace, C. Grant, W. E. Geiger, J. Am. Chem. Soc. 118, 12683 (1996)), and it therefore behaves as a polycation whose charge density can be controlled between a 0 and +1 charge for each polymer repeat unit (on average). Therefore, PFS would have continuously variable interactions with any solvent it is in contact with. As an experimental demonstration of this phenomenon, the PFS-silica composite opals were subjected to multiple partial oxidations using a solution in dichloromethane (DCM) of tris(4-bromophenyl)ammonium hexa-fluorophosphate, a one-electron oxidant, which is known to cleanly oxidize ferrocene derivatives (E. Steckhan, Angew. Chem., Int. Ed. Engl. 25, 683, (1986)). After thorough washing and drying, the oxidized sample was swollen in carbon disulfide and an absorbance spectrum taken. From this spectrum, the degree of polymer oxidation could be estimated based on the intensity of the characteristic ferrocenium LMCT band. After drying the sample, it was again oxidized, and these steps repeated until the LMCT transition no longer increased in intensity. The spectra obtained are shown in FIG. 6(A), and the wavelength at maximum intensity for the peaks is plotted against the degree of polymer oxidation in FIG. 6(B). Specifically, FIG. 6(a) is a plot showing the spectra obtained for the same composite silica crosslinked metallopolymer (PFS) gel colloidal photonic crystal film sample with different degrees of oxidation after swelling the sample in carbon disulfide n=1.627, $\delta_s$=20.5. The order of spectra, from least to most oxidized is: Solid squares; Empty squares; Empty circles; Solid circles; Empty diamonds. FIG. 6(b) shows the maximum values of the Bragg diffraction peaks shown in (a) plotted against the degree of polymer oxidation calculated from the intensity of the metallopolymer backbone ferrocenium ligand-to-metal-charge-transfer (LMCT) band maximum at 635 nm. The degree of oxidation of the metallopolymer is an estimate since it was calculated assuming a constant background level.

As can clearly be seen, the diffracted wavelength in the swollen state steadily decreases with an increase in oxidation state, since a charged polymer cannot be effectively solvated by a non-polar solvent. Not only can the diffracted wavelength in this system be varied between two extremes, but all intermediate states can be individually and controllably accessed. An interesting point to note is the increase in peak position on going from the 90% to 100% oxidized sample. It could be that along with an increase in charge density, oxidation might also be changing the refractive index of the polymer either through anion incorporation or a polarizability change in the polymer itself.

When a sample was oxidized in the above fashion then reduced with a solution of decamethylferrocene in DCM, the spectrum obtained upon solvent swelling was virtually superimposable to the spectrum in the same solvent before oxidation (data not shown; see supporting information). This indicates that the system is reversible, a necessary requirement for use in practical applications of electro-photonically tunable colloidal photonic crystals.

EXAMPLE 8

Optical Properties of Electrochemically Tunable Planarized Colloidal Photonic Crystal-Metallopolymer-Gel Network To test the behavior of planarized colloidal photonic crystal-metallopolymer-gel network samples when cycled electrochemically an electrochemical cell was constructed. The cell itself consisted of the optical cell used for probing the response of samples to liquid solvent as per example 6, and thin wires were sandwiched between the Teflon gaskets separating the top and bottom quartz plates delimiting the optical cell. The working electrode in the cell consisted of the planarized colloidal photonic crystal-metallopolymer-gel network supported on a conductive glass substrate such as ITO or FTO, and the conductive glass was contacted to a platinum wire fed outside the cell by a piece of Teflon sandwiching the two together. The counter electrode consisted of a platinum wire mesh with a platinum wire lead fed outside the cell. The reference electrode, properly a quasi-reference electrode, consisted of a silver wire where the end immersed in the electrochemical cell electrolyte had been previously coated with a layer of silver chloride by electrochemically anodizing the silver wire in 1M aqueous HCl. Finally, the cell was then filled with dry solvent and supporting electrolyte in a nitrogen-filled glovebox and brought out of the glovebox for electrochemical and optical measurements. To first determine the electrochemical behavior of the metallopolymer itself, cyclic voltammetry was performed on the pure samples.

Figure 11:
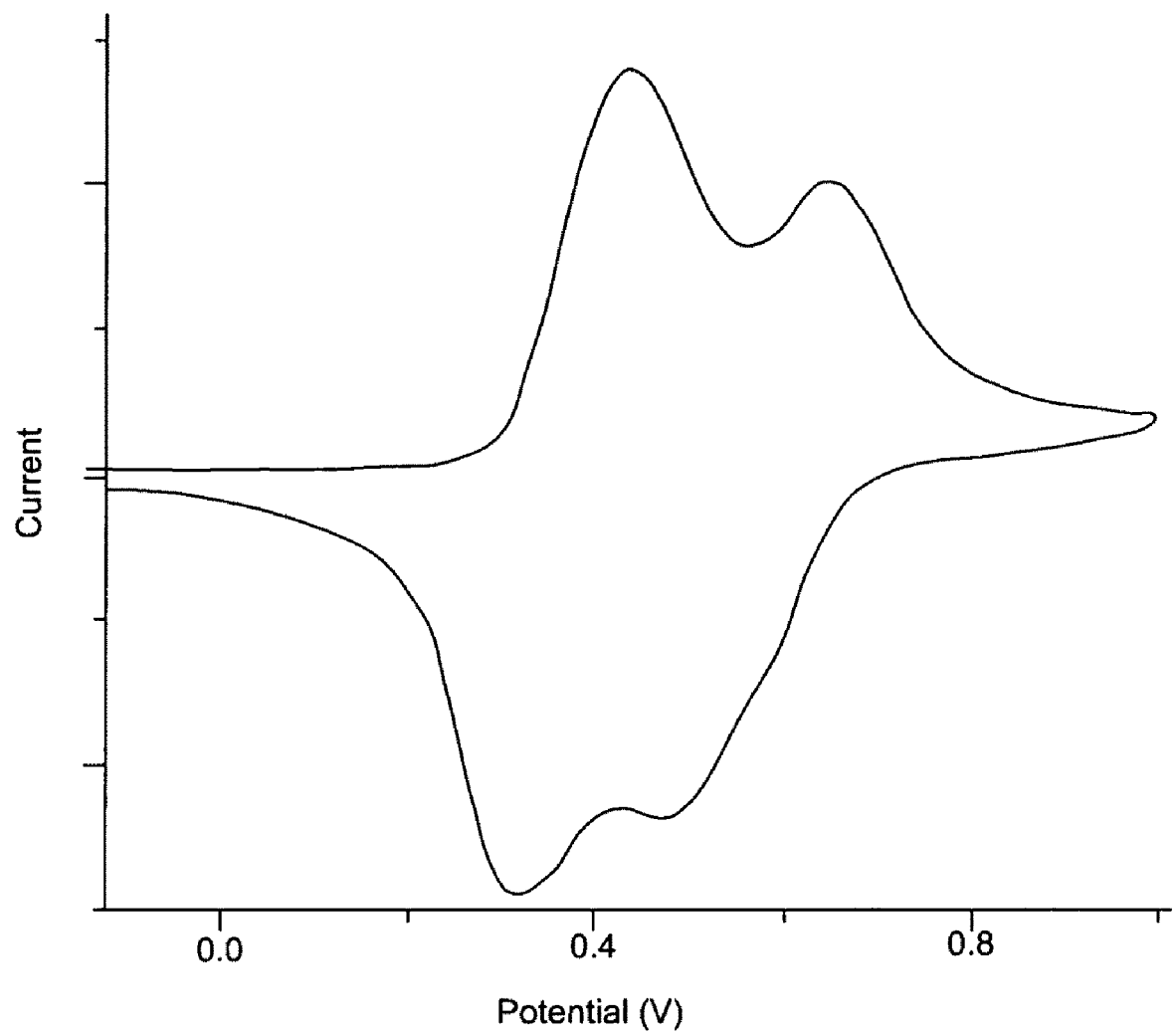
FIG. 11 is a cyclic voltamagram (CV) of a film of metallopolymer (PFS) gel supported on a conductive ITO substrate. This CV was obtained using a scan rate of 100 mV/s in dichloromethane with 0.5 M of tetrabutylammonium hexafluorophosphate electrolyte.

A sample cyclic voltammogram is shown in FIG. 11, where we can clearly see two oxidation and two reduction waves, where the first wave corresponds to oxidation/reduction of every other iron atom in the ferrocene units comprising the backbone of the metallopolymer. In this case an electrolyte consisting of 0.5 M tetrabutylammonium hexafluorophosphate in dichloromethane was used. If a sample was oxidized using a potential within the range of the two oxidation waves in the cyclic voltammogram, it was found to be quite stable to cycling. However, if a sample was oxidized beyond the second oxidation wave, some polymer chain degradation was observed, and further allowing the overoxidation to proceed resulted in the total degradation of the sample.

Figure 12:
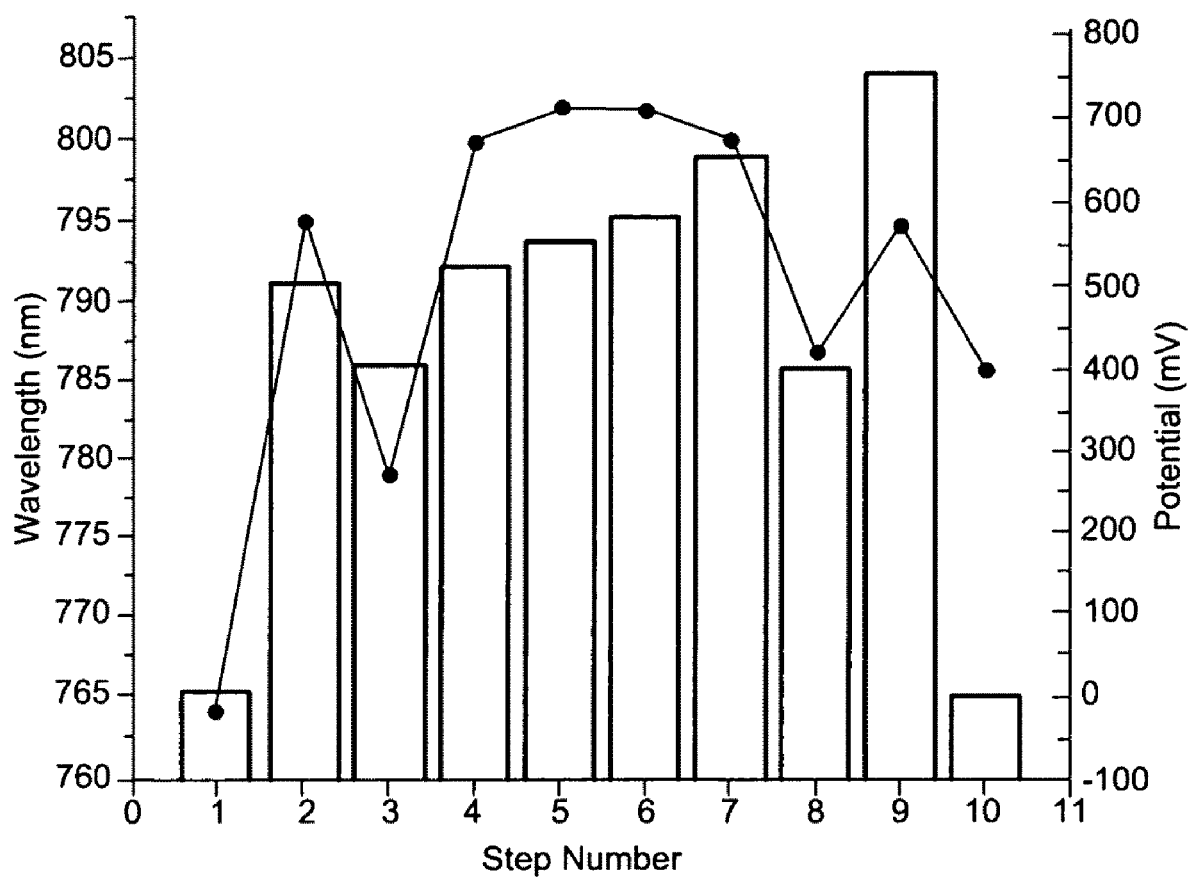
FIG. 12 is a plot of the composite silica crosslinked metallopolymer (PFS) gel colloidal photonic crystal film stop band position (blue line) versus the electrochemical potential applied (bars). The electrolyte consists of 0.5 M tetrabutylammonium hexafluorophosphate in dichloromethane. For each step the potential was kept at the indicated value for 2 minutes before the stop band position was determined. Note the correlation between the stop band wavelength and applied potential of the composite silica crosslinked metallopolymer (PFS) gel colloidal photonic crystal film.

Once the redox potentials of the metallopolymer film were elucidated with cyclic voltammetry, an experiment was carried out to probe the stop-band position of the sample with respect to the degree of electrochemical oxidation. This was done, by monitoring the optical properties of the film using a CCD array fiber optics spectrometer. The incoming beam was oriented perpendicular to the sample surface. Shown in FIG. 12 are the results of one of these experiments which shows a plot of the composite silica crosslinked metallopolymer (PFS) gel colloidal photonic crystal film stop band position (blue line) versus the electrochemical potential applied (bars). The electrolyte consists of 0.5 M tetrabutylammonium hexafluorophosphate in dichloromethane. For each step the potential was kept at the indicated value for 2 minutes before the stop band position was determined. Note the correlation between the stop band wavelength and applied potential of the composite silica crosslinked metallopolymer (PFS) gel colloidal photonic crystal film. As can be seen, the more oxidizing is the potential applied to the sample, the greater the swelling of the sample and thus the greater the red-shift in the stop-band. This is presumably because of electro-osmotic influx of the solvent molecules, which are solvating the counter-ions which diffuse into the film to ion-pair with the oxidize ferrocene moieties in the backbone of the polymer. As well as probing the stop-band position, we could also at the same time monitor the state of oxidation of the polymer indicated by the intensity of the ligand-to-metal-charge-transfer (LMCT) absorption of oxidized ferrocene moieties in the backbone of the polymer.

Figure 13:
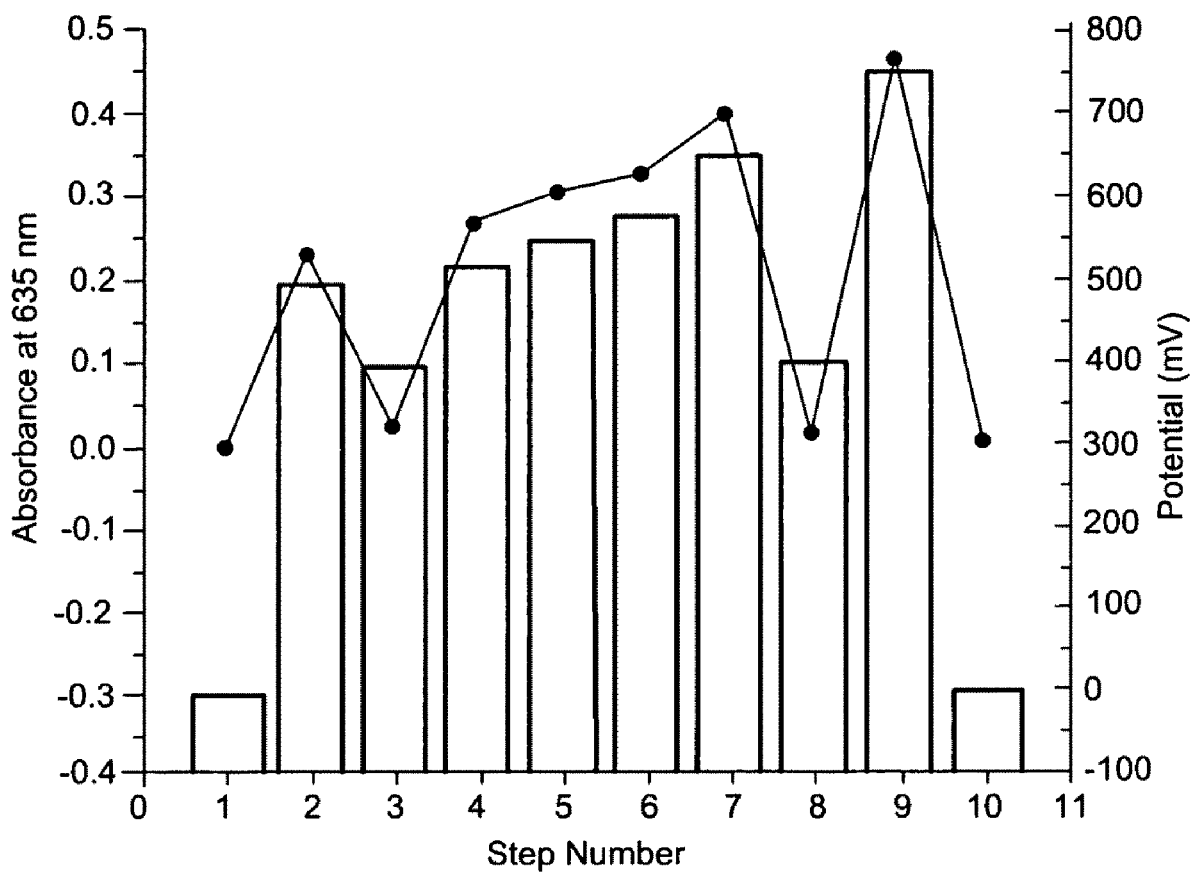
FIG. 13 is a plot of the intensity of the absorbance at 635 of a composite silica cross-linked metallopolymer (PFS) gel colloidal photonic crystal film sample, representing the ligand to metal transition of oxidized ferrocene (red line), versus the electrochemical potential applied (bars). The electrolyte consists of 0.5 M tetrabutylammonium hexafluorophosphate in dichloromethane. For each step the potential was kept at the indicated value for 2 minutes before the absorbance value was determined. Note the extremely good correlation between the applied potential and the degree of oxidation of the composite silica cross-linked metallopolymer (PFS) gel colloidal photonic crystal film.

FIG. 13 shows a plot of the intensity of the absorbance at 635 of a composite silica cross-linked metallopolymer (PFS) gel colloidal photonic crystal film sample, representing the ligand to metal transition of oxidized ferrocene (red line), versus the electrochemical potential applied (bars). The electrolyte consists of 0.5 M tetrabutylammonium hexafluorophosphate in dichloromethane. For each step the potential was kept at the indicated value for 2 minutes before the absorbance value was determined. Note the extremely good correlation between the applied potential and the degree of oxidation of the composite silica cross-linked metallopolymer (PFS) gel colloidal photonic crystal film. As can be seen in FIG. 13, the redox state of the polymer is very well behaved, and can be tuned to any percent of oxidation simply by varying the applied potential, a unique property of this unique class of metallopolymer.

The effects of over-oxidation could be used to advantageously modify the swelling properties of planarized silica PFS-gel composite colloidal photonic crystals. It was found that if the samples were oxidized using a potential above the second oxidation wave of PFS then reduced again electrochemically, this resulted in a minor amount of chain cleavage, which effectively reduced the crosslink density of the gel and allowed the sample to swell to a greater degree than it did before the electrochemical over-oxidation.

Figure 14:
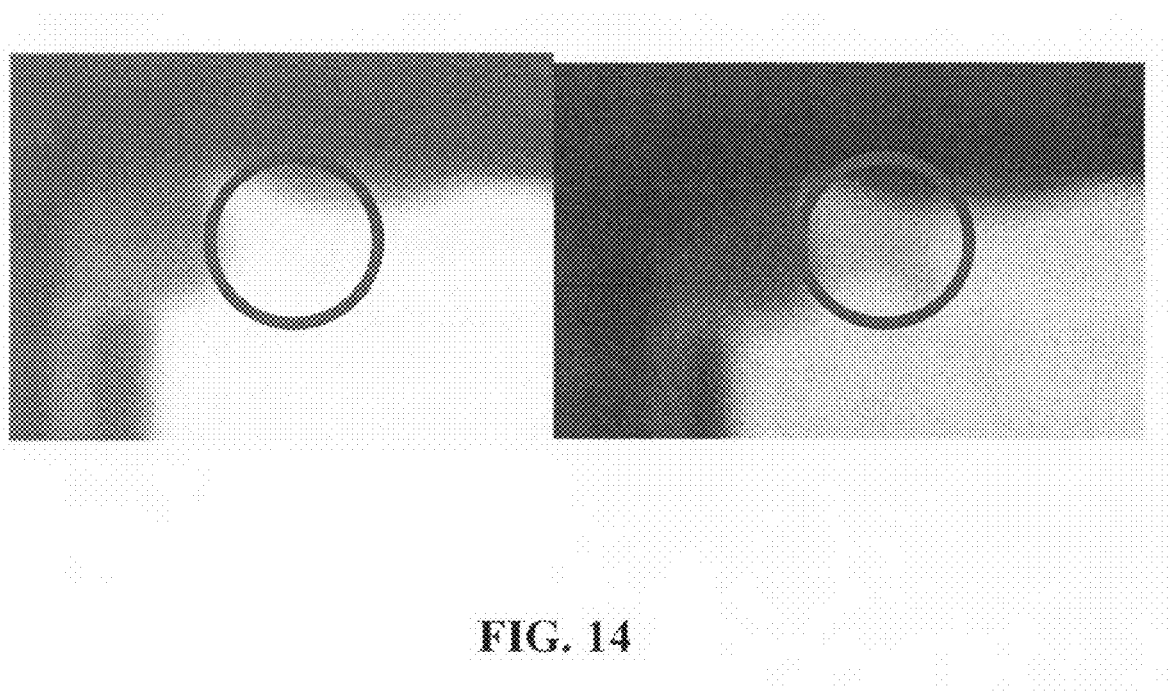
FIG. 14 is an optical photograph of a pixel of planarized composite silica cross-linked metallopolymer (PFS) gel colloidal photonic crystal film supported on a F-doped tin oxide substrate. The photograph on the left shows the pixel in its reduced state and on the right its oxidized state. The colour change is due to the light yellow colour of reduced ferrocene and the blue colour of oxidized ferrocene. The stop band of this sample occurs in the near infrared, and thus is not visible in an optical picture.

In addition, the electrochemical tuning of the properties of the metallopolymer composite samples could be localized to a small area by pixellating a preformed sample. The pixellation was performed by micro-cutting with a tungsten carbide tip, which scratched through the conductive glass coating and effectively electrically isolated that area of the film. FIG. 14 shows two optical photographs of a pixel of planarized composite silica cross-linked metallopolymer (PFS) gel colloidal photonic crystal film supported on a F-doped tin oxide substrate. The photograph on the left shows the pixel in its reduced state and on the right its oxidized state. The colour change is due to the light yellow colour of reduced ferrocene and the blue colour of oxidized ferrocene. The stop band of this sample occurs in the near infrared, and thus is not visible in an optical picture so that the colors visible in this picture do not arise from diffraction, but rather arise from the color difference between the reduced and oxidized state of the polymer.

EXAMPLE 9

Removal of Microspheres from a Planarized Colloidal Photonic Crystal-Metallopolymer-Gel Network to Give a Macroporous Metallopolymer Film The first step in the formation of a macroporous planarized colloidal photonic crystal-metallopolymer-gel network is the synthesis of a sample according to example 1 or example 2. Immersing these samples in a 1.5% solution of hydrofluoric acid in water for 2 days results in the removal of the silica microspheres and the formation of a free-standing macroporous PFS film.

Figure 15:
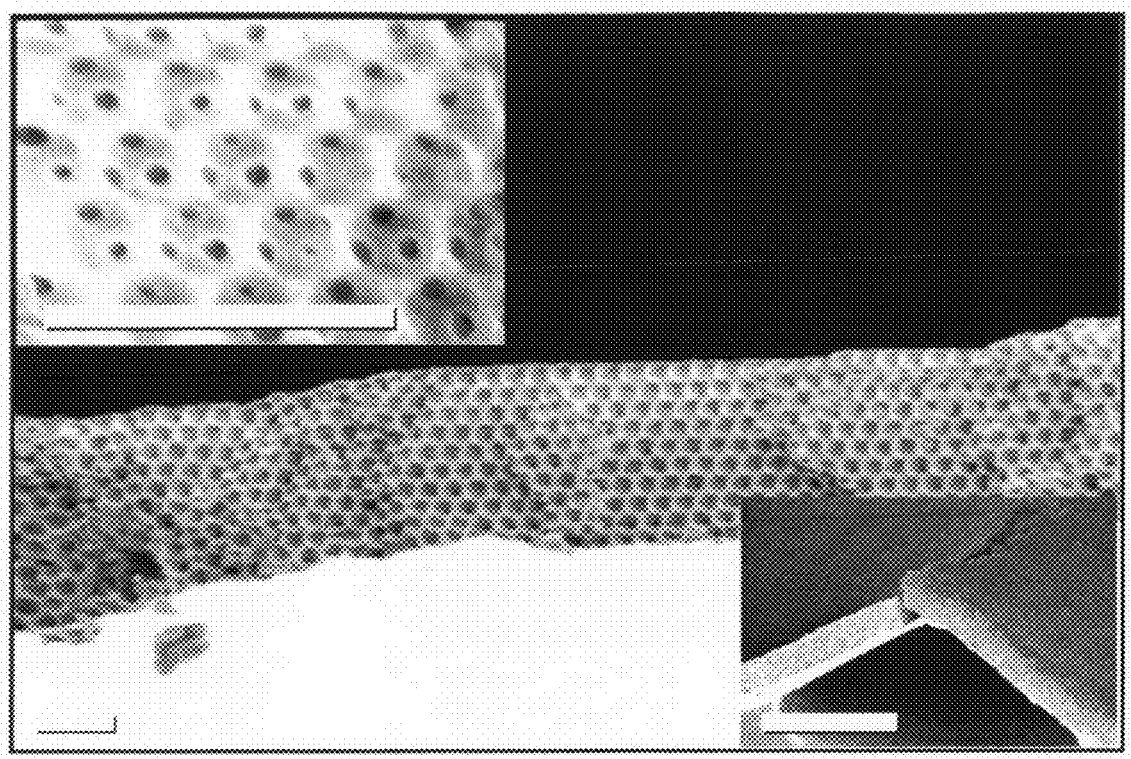
FIG. 15 are scanning electron micrographs (SEM) of a free-standing film of macroporous metallopolymer (PFS) gel fabricated by sputtering a layer of gold on the top side of a composite silica crosslinked metallopolymer (PFS) gel colloidal photonic crystal film and subsequently etching the silica spheres and substrate with 1.5% aqueous HF. The scale bars in the main figure and the top left inset represent 1 micrometer, whereas the scale bar in the bottom right inset represents 10 micrometers. Note the high structural quality of the film sample, which clearly shows the existence in the metallopolymer gel matrix of well ordered macropores replicating the size and shape and location of the original fcc close packed microspheres in the colloidal crystal and well ordered mesopores reflecting the locations in the colloidal crystal where fcc close packed microspheres just touched.

To achieve a greater mechanical stability as well as confer an electrical contact to the redox-active macroporous metallopolymer film, a film of gold or other metal of a thickness between 10 and 2000 nm is deposited by argon-ion sputtering onto the top surface of a sample prepared according to example 1 or 2 prior to etching of the silica spheres. The silica is then etched as per above, and the result is a thin metal-coated film of inverse opal metallopolymer gel. SEM images of one of these films are shown in FIG. 15, clearly showing the absence of the silica spheres and substrate and the resulting three-dimensional porosity. More particularly, the scanning electron micrographs in FIG. 15 of a free-standing film of macroporous metallopolymer (PFS) gel fabricated by sputtering a layer of gold on the top side of a composite silica crosslinked metallopolymer (PFS) gel colloidal photonic crystal film and subsequently etching the silica spheres and substrate with 1.5% aqueous HF. The scale bars in the main figure and the top left inset represent 1 micrometer, whereas the scale bar in the bottom right inset represents 10 micrometers. Note the high structural quality of the film sample, which clearly shows the existence in the metallopolymer gel matrix of well ordered macropores replicating the size and shape and location of the original fcc close packed microspheres in the colloidal crystal and well ordered mesopores reflecting the locations in the colloidal crystal where fcc close packed microspheres just touched.

An optical microscope image of one of these free-standing films of macroporous metallopolymer (PFS) gel created by HF etching of a silica-PFS gel composite colloidal crystal is (not shown), shows the brilliant iridescent colors available from these materials and attests to their high quality structural properties and high level of optical photonic crystal properties.

To support the PFS-gel inverse opal film on a transparent polymethylmethacrylate substrate requires a slightly modified synthetic procedure. A colloidal crystal film as prepared by the method described in example 1 is treated with the crosslinker 2 in dichloromethane, using a 1-10 mol % of 4-dimethylaminopyridine as catalyst. The film is then washed well in dichloromethane and dried. The colloidal crystal film is then placed face up on the surface of a hot plate equilibrated at approximately 60° C., and onto the surface of the film is dropped about 50 mg of a mixture of di"propylsila-1-ferrocenophane, 90% by weight, and silacyclobutylsila-1-ferrocenophane, 10% by weight. Once the monomer mixture has melted, a sheet of polymethylmethacrylate (PMMA, Plexiglass®) is placed on top of the molten droplet and the assembly clamped together with foldback binder clips. The sample is then thermally polymerized at 70° C. for 48 hours. Finally, the sample is soaked in a 1.5% aqueous HF solution for 1 to 4 days, which dissolves both the silica substrate and silica spheres and leaves a macroporous polymer inverse opal film on the PMMA substrate. Alternatively, the PMMA sheet can be replaced by a sheet of Mylar (polyethyleneterepthalate), a flexible transparent polymer.

In summary, the present invention provides a composite photonic crystal material produced made of an metallopolymer gel film and microparticles located therein which has an adjustable lattice dimension so that the wavelength of optically Bragg diffracted light from the composite film can be tuned. The materials can be produced in the form of a film or patterned film or shape of any dimension or array of shapes of any dimension. These new materials have a continuously and finely, rapidly and reversibly, reproducibly and predictably, adjustable photonic crystal lattice dimension and concomitantly the predetermined ability to cause light of widely different wavelengths to be continuously and finely, rapidly and reversibly, reproducibly and predictably, and efficiently reflected or transmitted across the ultraviolet, visible and near infrared regions of the electromagnetic spectrum.

The tunable polychromicity of this composite colloidal photonic crystal device has utility in a myriad of applications requiring wavelength tunability of light, exemplified but not limited to optical components like filters, mirrors, multiplexors, compensators, limiters and switches of use in optical telecommunication systems as well as color tunable materials of use in imaging, display, printing, fingerprinting and sensing systems.

As mentioned in the Background above, it is noted that in the prior PCCA work a matrix encapsulates the colloidal crystal which is an organic polymer gel, which as amplified upon below is quite distinct in its composition and properties to the metallopolymer gels used in the invention described herein. In this context it is important to note that there exists a major distinction between the class of polymerized crystalline colloidal crystal arrays PCCAs that form the basis of all of Asher and co-workers studies and those that form the centerpiece of the embodiment described herein. In the approach of Asher and co-workers as well as other groups that followed his lead as mentioned above they exclusively self-assemble highly charged monodisperse spheres within an organic polymer hydrogel and immobilizes them within the organic polymer hydrogel as a non-close-packed colloidal crystal arrangement.

It is important to realize that this type of non-close-packed PCCA is not an ideal arrangement for the applications envisioned for this type of material first because it is very difficult to prepare the materials in a reproducible fashion and further because the structural and hence the optical properties of the materials are extremely sensitive to any adventitious changes in its immediate environment, like fluctuations of temperature, vibrations, humidity and so forth.

In sharp contradistinction to the PCCA, the colloidal photonic crystal materials that are the foundation of the work described in the present embodiment are intentionally designed to be different in a number of profound ways to the PCCAs of Asher and co-workers and furthermore at the same time avoid problems inherent in the PCCA materials employed in the work of Asher and co-workers. First the microspheres that constitute the desired colloidal photonic crystal used in the work described herein are pre-assembled into a stable and close packed arrangement. Second the polymer precursor is infiltrated into and polymerized within the void spaces between the constituent spheres that are intentionally close packed in the colloidal photonic crystal to provide a stable arrangement. Third the polymer that occupies the void spaces between the spheres in the colloidal photonic crystal is not an organic polymer gel and neither is it a polymer hydrogel instead it is a unique kind of metallopolymer gel with unique properties as a consequence of the fact that there exist metal atoms integrated into the backbone of the metallopolymer (or metallooligomer). Fourth, it is important to note that at the time that Asher and co-workers described most of his work on PCCAs, the metallopolymer (or metallooligomer) gel that is used exclusively in the work described herein had never before been synthesized and had never before been described in the open or patent literature.

As used herein, the terms "comprises", "comprising", "includes" and "including" are to be construed as being inclusive and open ended, and not exclusive. Specifically, when used in this specification including claims, the terms "comprises", "comprising", "includes" and "including" and variations thereof mean the specified features, steps or components are included. These terms are not to be interpreted to exclude the presence of other features, steps or components.

The foregoing description of the preferred embodiments of the invention has been presented to illustrate the principles of the invention and not to limit the invention to the particular embodiment illustrated. It is intended that the scope of the invention be defined by all of the embodiments encompassed within the following claims and their equivalents.

The invention claimed is:

1. A method of wavelength tuning a composite material, comprising: a) producing an ordered array of first constituents having a first refractive index embedded within a cross-linked metallopolymer network having a second refractive index different than the first refractive index, the ordered array of first constituents having a lattice spacing giving rise to Bragg diffraction when the composite material is illuminated, the cross-linked metallopolymer network being comprised of a polymer backbone including metal atoms chemically integrated into the polymer backbone and connected together directly or through linking units, the cross-linked polymer network having an electronic configuration dependant on the metal atoms, the metal atoms being switchable between more than one electronic configuration, the cross-linked metallopolymer network being expandable and contractible in response to controlled uptake and expulsion, respectively, of a selected fluid by the cross-linked metallopolymer network so that when the cross-linked polymer network takes up the selected fluid it expands which shifts a Bragg diffraction wavelength to longer wavelengths and when the cross-linked polymer network expels the selected fluid it contracts which shifts the Bragg diffraction wavelength to shorter wavelengths, the amount of fluid uptake and expulsion being controlled by controlling the electronic configuration of the cross-linked polymer network; and b) switching the electronic configuration of the cross-linked metallopolymer network so that the cross-linked polymer network changes dimensions and modulates the lattice spacing of the ordered array of first constituents, which shifts the Bragg diffraction wavelength to a pre-selected wavelength.

2. A method according to claim 1 wherein the step of switching the electronic configuration of the cross-linked metallopolymer network is performed on a localized spatial area of the cross-linked polymer network.

3. A method according to claim 1 wherein the step of switching the electronic configuration of the cross-linked metallopolymer network includes switching a given proportion of the metal atoms to a predetermined oxidation state.

4. A method according to claim 3 where the oxidation state of the given proportion of the metal atoms is switched by the application of a pre-selected stimulus.

5. A method according to claim 4 wherein the stimulus includes exposing the composite material to a substance which is an oxidizing agent and switches the oxidation state of a given proportion of the metal atoms to a higher oxidation state.

6. A method according to claim 5 wherein the oxidizing agent is selected from the group consisting of transition metal complexes, main group compounds, radicals, radical cations and combinations thereof.

7. A method according to claim 4 wherein the stimulus includes exposing the composite material to a substance which is an reducing agent and switches the oxidation state of a given proportion of the metal atoms to a lower oxidation state.

8. A method according to claim 7 wherein the reducing agent is selected from the group consisting of transition metal complexes, main group compounds, alkali metals, alkali earth metals, radicals, radical anions and combinations thereof.

9. A method according to claim 4 wherein the stimulus includes exposing the composite material to electromagnetic radiation.

10. A method according to claim 4 wherein the stimulus includes exposing the composite material to electromagnetic radiation in the presence of a substance which upon exposure to the electromagnetic radiation becomes an oxidizing agent or reducing agent.

11. A method according to claim 4 wherein the stimulus includes exposing the composite material to electromagnetic radiation which creates a temporary change in oxidation state of a given proportion of the metal atoms within the cross-linked metallopolymer network.

12. A method according to claim 4 wherein the stimulus includes exposing the composite material to a change in temperature.

13. A method according to claim 4 wherein the stimulus includes exposing the composite material to a change in temperature in the presence of a substance which upon exposure to the change in temperature becomes an oxidizing agent or reducing agent.

14. A method according to claim 4 wherein the stimulus includes exposing the composite material to a change in temperature which creates a temporary change in oxidation state of a given proportion of the metal atoms within the cross-linked metallopolymer network.

15. A method according to claim 4 wherein the stimulus includes exposing the composite material to an electric field.

16. A method according to claim 15 wherein the electric field causes an increase in the oxidation state of a given proportion of the metal atoms within the cross-linked metallopolymer network.

17. A method according to claim 15 wherein the electric field causes a decrease in the oxidation state of a given proportion of the metal atoms within the cross-linked metallopolymer network.

18. A method according to claim 15 wherein the electric field causes a redistribution in the oxidation states or charge distribution of a given proportion of the metal atoms within the cross-linked metallopolymer network.

19. A method according to claim 1 wherein the fluid is a gas of controlled static pressure.

20. A method according to claim 1 wherein the fluid is a gas, the composite material being exposed to a controlled flow of the gas.

21. A method according to claim 1 wherein the fluid is a liquid of controlled static pressure.

22. A method according to claim 1 wherein the fluid is a liquid, the composite material being exposed to a controlled flow of the liquid.

* * * * *